US010594987B1

(12) United States Patent
Nixon et al.

(10) Patent No.: US 10,594,987 B1
(45) Date of Patent: Mar. 17, 2020

(54) IDENTIFYING AND LOCATING OBJECTS BY ASSOCIATING VIDEO DATA OF THE OBJECTS WITH SIGNALS IDENTIFYING WIRELESS DEVICES BELONGING TO THE OBJECTS

(71) Applicant: Amazon Technologies, Inc., Seattle, WA (US)

(72) Inventors: Quinton Choice Nixon, Sherman Oaks, CA (US); James Siminoff, Pacific Palisades, CA (US); Ahmad Shahamat, Thousand Oaks, CA (US); Joshua Yoon, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/424,970

(22) Filed: May 29, 2019

Related U.S. Application Data

(60) Provisional application No. 62/677,951, filed on May 30, 2018.

(51) Int. Cl.
| | |
|---|---|
| *H04N 7/18* | (2006.01) |
| *H04W 4/02* | (2018.01) |
| *G06T 7/292* | (2017.01) |
| *H04N 5/247* | (2006.01) |

(52) U.S. Cl.
CPC ............ *H04N 7/181* (2013.01); *G06T 7/292* (2017.01); *H04N 5/247* (2013.01); *H04N 7/188* (2013.01); *H04W 4/023* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

| 9,883,302 B1* | 1/2018 | DeChellis | H04R 29/00 |
| 10,114,221 B1* | 10/2018 | Evans, V | G03B 29/00 |
| 10,116,904 B2* | 10/2018 | Addy | H04N 7/181 |
| 2011/0320612 A1* | 12/2011 | Oka | H04W 4/023 |
| | | | 709/227 |

(Continued)

*Primary Examiner* — Jefferey F Harold
*Assistant Examiner* — Mustafizur Rahman
(74) *Attorney, Agent, or Firm* — Greenberg Traurig, LLP

(57) ABSTRACT

A method includes receiving video data from an A/V recording and communication device (A/V device) having a camera, the video data representing an object in a field of view (FOV) of the camera. The method further includes receiving, from the A/V device, identifying information for a wireless device proximate the object in the FOV of the camera (the FOV identifying information). The method further includes, after receiving the FOV identifying information, storing the video data and the FOV identifying information in a memory. The method further includes receiving identifying information for one or more wireless devices associated with activity of interest (the identifying information of interest). The method further includes determining that the FOV identifying information matches the identifying information of interest. The method further includes, after determining that the FOV identifying information matches the identifying information of interest, creating a record associating the video data with activity of interest.

20 Claims, 19 Drawing Sheets

(56) References Cited

U.S. PATENT DOCUMENTS

| | | | |
|---|---|---|---|
| 2014/0368601 A1* | 12/2014 | decharms | H04W 4/021 |
| | | | 348/14.02 |
| 2016/0165187 A1* | 6/2016 | Rasheed | G06K 9/3241 |
| | | | 348/143 |
| 2016/0180198 A1* | 6/2016 | Davis | G06T 3/00 |
| | | | 382/159 |
| 2017/0186291 A1* | 6/2017 | Wenus | G08B 13/19608 |
| 2018/0288310 A1* | 10/2018 | Goldenberg | H04N 5/23212 |
| 2018/0350213 A1* | 12/2018 | Bart | H04N 7/186 |
| 2019/0063140 A1* | 2/2019 | Trundle | G06K 9/325 |
| 2019/0121216 A1* | 4/2019 | Shabtay | G02B 26/105 |

* cited by examiner

IDENTIFYING AND LOCATING OBJECTS BY ASSOCIATING VIDEO DATA OF THE OBJECTS WITH SIGNALS IDENTIFYING WIRELESS DEVICES BELONGING TO THE OBJECTS

CROSS-REFERENCE TO RELATED APPLICATION

This application claims priority to provisional application Ser. No. 62/677,951, filed on May 30, 2018, the entire contents of which are hereby incorporated by reference.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present identifying and locating objects by associating video data of the objects with signals identifying wireless devices belonging to the objects have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that images captured by A/V recording and communication devices sometimes do not clearly depict persons in the field of view (FOV) of the camera. For example, the person in the FOV may be too far away from the camera, or the lighting conditions may not be adequate to produce a clear image. Unclear images can be of limited value when attempting to identify a potential criminal suspect in the images. Another aspect of the present embodiments includes the realization that persons recorded in video footage are often carrying wireless devices, such as smartphones, that emit signals including identifying information for the wireless devices. Another aspect of the present embodiments includes the realization that A/V recording and communication devices, such as video doorbells, if properly equipped, may be able to detect the signals emitted by wireless devices.

Accordingly, the present embodiments solve the problems outlined above by leveraging the functionality of A/V recording and communication devices to record video data of persons, and to receive identifying signals from wireless devices carried by the recorded persons, to thereby facilitate the identification of persons of interest. For example, image, video, and/or audio data of a person of interest captured by an A/V recording and communication device may be stored in the cloud along with wireless device identifying information received contemporaneously with the recording of the image, video, and/or audio data. The stored data and wireless device identifying information may subsequently be used to identify persons suspected of criminal activity, or other persons of interest to police. In other embodiments, identifying signals from wireless devices may be used to locate, in real time, criminal suspects, kidnapping victims, or other persons of interest. In still further embodiments, identifying signals from wireless devices may be used to determine whether a person entering a premises is an intruder or someone more benign, such as a resident, roommate, family member, etc. These and other embodiments are described in detail below.

In a first aspect, a method for identifying a wireless device in data collected from an A/V recording and communication device is provided. The A/V recording and communication device may include a camera and a communication module. The method may include recording, by the camera of the A/V recording and communication device, video data of an object in an FOV of the camera. The object may have associated therewith and proximate thereto the wireless device. The method may include receiving, by the communication module of the A/V recording and communication device, a signal from the wireless device. The signal may include identifying information for the wireless device. The method may include transmitting, by the communication module of the A/V recording and communication device, the video data and the identifying information for the wireless device to a network-connected device.

In an embodiment of the first aspect, the network-connected device is one of a hub device and a server.

In an embodiment of the first aspect, the method may further include detecting, by a motion sensor of the A/V recording and communication device, motion of the object.

In an embodiment of the first aspect, the method may further include, in response to detecting the motion of the object, waking the communication module from a passive state to begin receiving the signal from the wireless device.

In an embodiment of the first aspect, the method may further include receiving, by the communication module, a camera activation instruction. The camera activation instruction may have been sent by the network-connected device in response to a notification of an occurrence of an event involving the object and the associated wireless device.

In an embodiment of the first aspect, transmitting the video data and the identifying information for the wireless device to the network-connected device may include transmitting the video data and the identifying information associated with the video data to the network-connected device in response to receiving the camera activation instruction.

In an embodiment of the first aspect, the method may further include, in response to receiving the camera activation instruction, waking the communication module from a passive state to begin receiving the signal from the wireless device.

In an embodiment of the first aspect, in response to receiving the camera activation instruction, the method may further include waking the camera from a passive state to begin recording the video data.

In an embodiment of the first aspect, the notification may include pre-identified wireless device identifier data associated with the occurrence of the event.

In an embodiment of the first aspect, transmitting the video data and the identifying information for the wireless device to the network-connected device may include: transmitting the video data to the network-connected device; and transmitting the identifying information to the network-connected device after transmitting the video data to the network-connected device.

In an embodiment of the first aspect, the signal from the wireless device may be encoded and the method may further include decoding the signal from the wireless device.

In an embodiment of the first aspect, the method may further include storing the decoded signal in a memory of the A/V recording and communication device.

In an embodiment of the first aspect, the method may further include storing the signal in a memory of the A/V recording and communication device.

In an embodiment of the first aspect, the method may further include storing the video data in a memory of the A/V recording and communication device.

In an embodiment of the first aspect, the signal may include at least one of: a Bluetooth signal, a Bluetooth-low energy signal, a WiFi signal, and a Zigbee signal.

In an embodiment of the first aspect, the method may further include determining, based on the video data, a direction of movement of the object.

In an embodiment of the first aspect, the method may further include determining, based on the video data, a speed of movement of the object.

In an embodiment of the first aspect, the object may include a person.

In an embodiment of the first aspect, the person is at least one of: a criminal suspect and a crime victim.

In an embodiment of the first aspect, the object may include a pet.

In an embodiment of the first aspect, the object may include a vehicle.

In an embodiment of the first aspect, the vehicle may include, as a driver or a passenger thereof, at least one of: a criminal suspect and a crime victim.

In an embodiment of the first aspect, the method may include receiving, by the communication module, permission data of a user of the A/V recording and communication device. The permission data may include one of: a presence of, and an absence of, permission to transmit the identifying information for the wireless device to the network-connected device.

In an embodiment of the first aspect, the method may include storing the permission data in a memory of the A/V recording and communication device.

In an embodiment of the first aspect, the method may include receiving, by the communication module, a request to transmit the identifying information for the wireless device to the network-connected device, where transmitting the video data and the identifying information for the wireless device to the network-connected device may include transmitting the identifying information to the network-connected device in response to the permission data including the presence of permission to transmit the identifying information to the network-connected device.

In an embodiment of the first aspect, the identifying information for the wireless device may include a media access control (MAC) address of the wireless device.

In an embodiment of the first aspect, the communication module includes a WiFi antenna communicatively coupled with a router, and the method may further include detecting an access request of the wireless device to a WiFi network associated with the A/V recording and communication device; determining that the MAC address for the wireless device is not associated with a listing of known MAC addresses for the WiFi network; and in response to determining that the MAC address for the wireless device is not associated with the listing of known MAC addresses for the WiFi network, transmitting the MAC address to the network-connected device.

In an embodiment of the first aspect, the method may further include, in response to determining that the MAC address for the wireless device is not associated with the listing of known MAC addresses for the WiFi network, waking the communication module from a passive state to begin receiving the signal from the wireless device.

In an embodiment of the first aspect, the method may further include, in response to determining that the MAC address for the wireless device is not associated with the listing of known MAC addresses for the WiFi network, waking the camera from a passive state to begin recording the video data.

In an embodiment of the first aspect, the method may further include determining a signal strength of the received signal from the wireless device; and in response to the determined signal strength being less than a predetermined signal strength, ignoring the received signal.

In a second aspect, a method for identifying a wireless device based on data collected by an A/V recording and communication device having a camera is provided. The method may include receiving, by a computing device, video data from the A/V recording and communication device of an object in the FOV of the camera. The object may have associated therewith and proximate thereto the wireless device. The method may include receiving, by the computing device from the A/V recording and communication device, identifying information for the wireless device. The method may include, in response to receiving the identifying information for the wireless device, storing, by the computing device, the video data and the identifying information for the wireless device in a memory. The method may include retrieving, from a database, a listing of identifying information for one or more wireless devices associated with activity of interest. The method may include determining, by the computing device, that the stored identifying information for the wireless device associated with the object in the FOV of the camera matches an entry of the listing of identifying information for one or more wireless devices associated with activity of interest. The method may include, in response to determining that the stored identifying information for the wireless device associated with the object in the FOV of the camera matches the entry of the listing of identifying information for one or more wireless devices associated with activity of interest, creating a record associating the stored video data with activity of interest.

In an embodiment of the second aspect, the method may further include storing, by the computing device, location data for the camera.

In an embodiment of the second aspect, the method may further include receiving, by the computing device, a notification of an occurrence of an event involving the wireless device.

In an embodiment of the second aspect, the method may further include, in response to receiving the notification, waking the computing device from a passive state to begin receiving the identifying information for the wireless device.

In an embodiment of the second aspect, the method may further include, in response to receiving the notification, waking the camera from a passive state to begin recording the video data.

In an embodiment of the second aspect, the notification may include a location associated with the occurrence of the event.

In an embodiment of the second aspect, the method may further include determining whether a location of the A/V recording and communication device is within a predetermined distance of the location associated with the occurrence of the event.

In an embodiment of the second aspect, storing the video data and the identifying information for the wireless device in the memory may include storing the video data and the identifying information in the memory in response to determining that the location of the A/V recording and communication device is within the predetermined distance of the location associated with the occurrence of the event.

In an embodiment of the second aspect, the notification may include pre-identified wireless device identifier data associated with the occurrence of the event.

In an embodiment of the second aspect, the method may further include, in response to receiving the identifying information for the wireless device including the pre-identified wireless device identifier data, causing a security system associated with the A/V recording and communication device to arm.

In an embodiment of the second aspect, the method may further include, in response to receiving the identifying information for the wireless device including the pre-identified wireless device identifier data, transmitting an alert indicating the receipt of the notification including the pre-identified wireless device identifier data to a client device associated with the A/V recording and communication device.

In an embodiment of the second aspect, the method may further include, in response to receiving the identifying information for the wireless device including the pre-identified wireless device identifier data, transmitting an alert indicating the receipt of the identifying information for the wireless device including the pre-identified wireless device identifier data to a system configured to monitor for emergency events.

In an embodiment of the second aspect, the A/V recording and communication device is a first A/V recording and communication device, and the method may further include, in response to the computing device receiving the identifying information for the wireless device including the pre-identified wireless device identifier data from the first A/V recording and communication device, causing at least a second A/V recording and communication device located within a predetermined distance of the first A/V recording and communication device to wake from a passive state to begin transmitting, to the computing device, the identifying information for the wireless device.

In an embodiment of the second aspect, the method may further include, in response to the computing device receiving the identifying information for the wireless device including the pre-identified wireless device identifier data from the first A/V recording and communication device, causing the first and the at least a second A/V recording and communication devices to transmit their respective locations to the computing device to facilitate locating the object.

In an embodiment of the second aspect, the camera is a first camera and the method may further include, in response to the computing device receiving the identifying information for the wireless device including the pre-identified wireless device identifier data from the first A/V recording and communication device, causing a second camera of the at least a second A/V recording and communication device to wake from a passive state to begin recording the video data.

In an embodiment of the second aspect, the method may further include, in response to the computing device receiving the identifying information for the wireless device including the pre-identified wireless device identifier data from the first A/V recording and communication device, causing the computing device to receive the identifying information for the wireless device from the at least a second A/V recording and communication device after receiving the video data from the at least a second A/V recording and communication device.

In an embodiment of the second aspect, storing the video data and the identifying information for the wireless device in the memory may include storing the video data in the memory; and storing the identifying information in the memory after storing the video data in the memory.

In an embodiment of the second aspect, the identifying information for the wireless device may be encoded and the method may further include decoding the identifying information for the wireless device.

In an embodiment of the second aspect, the method may further include storing the decoded identifying information for the wireless device in the memory.

In an embodiment of the second aspect, the method may further include determining, based on the video data, a direction of movement of the object.

In an embodiment of the second aspect, the method may further include determining, based on the video data, a speed of movement of the object.

In an embodiment of the second aspect, the object may include a person.

In an embodiment of the second aspect, the person may be at least one of: a criminal suspect and a crime victim.

In an embodiment of the second aspect, the object may include a pet.

In an embodiment of the second aspect, the object may include a vehicle.

In an embodiment of the second aspect, the vehicle may include, as a driver or a passenger thereof, at least one of: a criminal suspect and a crime victim.

In an embodiment of the second aspect, the method may further include receiving, by the computing device, permission data of a user of the A/V recording and communication device, the permission data including one of: a presence of, and an absence of, permission to store the identifying information for the wireless device in the memory.

In an embodiment of the second aspect, the method may further include storing, by the computing device, the permission data in the memory.

In an embodiment of the second aspect, the method may further include receiving, by the computing device, a request to transmit the identifying information for the wireless device to an administrator system; and in response to receiving the request, transmitting the video data and the identifying information for the wireless device to the administrator system in response to the permission data including the presence of permission to store the identifying information for the wireless device in the memory.

In an embodiment of the second aspect, the identifying information for the wireless device may include a MAC address of the wireless device.

In an embodiment of the second aspect, the A/V recording and communication device may include a WiFi antenna communicatively coupled with a router, and the method may further include: detecting, by the computing device, an access request of the wireless device to a WiFi network associated with the A/V recording and communication device; determining, by the computing device, that the MAC address for the wireless device is not associated with a listing of known MAC addresses for the WiFi network; and in response to determining that the MAC address for the wireless device is not associated with the listing of known MAC addresses for the WiFi network, storing, by the computing device, the MAC address in the memory.

In an embodiment of the second aspect, the method may further include, in response to determining that the MAC address for the wireless device is not associated with the listing of known MAC addresses for the WiFi network, waking the computing device from a passive state to begin receiving the identifying information for the wireless device.

In an embodiment of the second aspect, the method may further include, in response to determining that the MAC address for the wireless device is not associated with the listing of known MAC addresses for the WiFi network, waking the camera from a passive state to begin recording the video data.

In an embodiment of the second aspect, storing the video data and the identifying information for the wireless device in the memory may include storing, by the computing device, the video data and the identifying information for the wireless device in a memory of a network-connected device coupled in communication with the computing device.

In an embodiment of the second aspect, retrieving the listing of identifying information for the one or more wireless devices associated with activity of interest may include retrieving, by a network-connected device, the listing of identifying information for the one or more wireless devices associated with activity of interest from the database.

In an embodiment of the second aspect, creating the record associating the stored video data with activity of interest may include creating, by a network-connected device, the record associating the stored video data with activity of interest.

In an embodiment of the second aspect, storing the location data for the camera may include storing the location data for the camera in a memory of a network-connected device coupled in communication with the computing device.

In a third aspect, a method for geographically locating an object associated with activity of interest based on data collected from an A/V recording and communication device is provided. The object may have associated therewith and proximate thereto a wireless device. The method may include receiving, by a computing device from a first A/V recording and communication device: first video data of the object in a first FOV of a camera of the first A/V recording and communication device; and first identifying information for the wireless device. The method may include receiving an indication that at least one of the first video data, the object, and the wireless device is associated with activity of interest. The method may include receiving, by the computing device from a second A/V recording and communication device: second video data of the object in a second FOV of a camera of the second A/V recording and communication device; and second identifying information for the wireless device. The method may include determining that the first and second identifying information identify the same wireless device. The method may include associating the second video data with activity of interest.

In an embodiment of the third aspect, the method may further include identifying the object in the first and second video data.

In an embodiment of the third aspect, identifying the object in the first and the second video data may include determining that: a first appearance time of the object in the first video data is within a first predetermined amount of time of a first receipt time of the first identifying information for the wireless device; and a second appearance time of the object in the second video data is within a second predetermined amount of time of a second receipt time of the second identifying information for the wireless device.

In an embodiment of the third aspect, the object may include a vehicle and identifying the object in the first and the second video data may include matching, by the computing device using alphanumeric character recognition, at least a portion of a license plate of the vehicle in the first video data with at least a portion of the license plate of the vehicle in the second video data.

In an embodiment of the third aspect, the object may include a person, and identifying the object in the first and the second video data may include matching, by the computing device using facial feature recognition, at least a portion of a face of the person in the first video data with at least a portion of the face of the person in the second video data.

In an embodiment of the third aspect, the method may further include determining, based on the first and the second video data, a direction of movement of the object to facilitate locating the object.

In an embodiment of the third aspect, the method may further include determining, based on the first and second video data, a speed of movement of the object to facilitate locating the object.

In an embodiment of the third aspect, the object may include a person.

In an embodiment of the third aspect, the person may be at least one of: a criminal suspect and a crime victim.

In an embodiment of the third aspect, the object may include a vehicle.

In an embodiment of the third aspect, the vehicle may include, as a driver or a passenger thereof, at least one of: a criminal suspect and a crime victim.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

The various embodiments of the present identifying and locating objects by associating video data of the objects with signals identifying wireless devices belonging to the objects now will be discussed in detail with an emphasis on highlighting the advantageous features. These embodiments depict the novel and non-obvious identifying and locating objects by associating video data of the objects with signals identifying wireless devices belonging to the objects shown in the accompanying drawings, which are for illustrative purposes only. These drawings include the following figures, in which like numerals indicate like parts.

DETAILED DESCRIPTION

Figure 1:
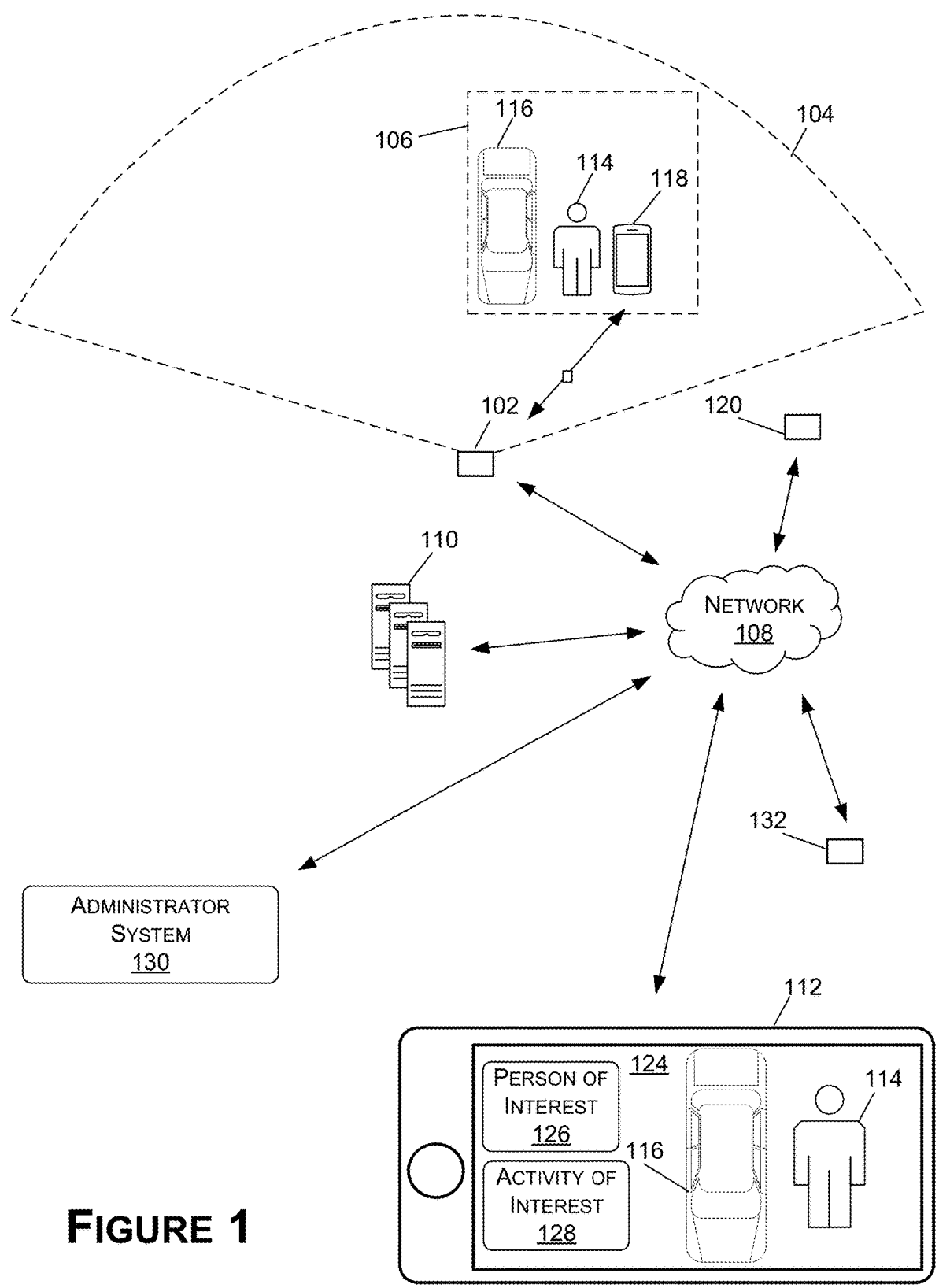
FIG. 1 is a schematic diagram of a system for identifying a wireless device associated with an object in data collected from an A/V recording and communication device, according to various aspects of the present disclosure.

Disclosed herein are systems and methods for identifying a wireless device associated with an object in data collected from an A/V recording and communication device. The disclosed systems and methods facilitate geographically locating the object (when the object is associated with activity of interest, for example) based on the data collected from the A/V recording and communication device. As described in greater detail below, one or more A/V recording and communication devices are situated in a geographic area (e.g., a neighborhood, a city, etc.). Each A/V recording and communication device has a video camera and may record the object in the field of view (FOV) of its video camera. The resulting video data may be transmitted to network-connected devices in communication with the A/V recording and communication device(s), and the video data may be further processed to, for example, identify and/or otherwise characterize the object for purposes of determining if the object is, for instance, associated with activity of interest reported in the geographic area.

The object (e.g., a person) in proximity to the A/V recording and communication device may be carrying a wireless device (e.g., a smartphone). The disclosed systems and methods receive signals from the wireless device carried by the person. The A/V recording and communication device may be capable of receiving the signals from the wireless device even where the object is not in the FOV of the camera. For example, upon at least one occurrence of the A/V recording and communication device recording image data of the person contemporaneously with receiving signal(s) with identifying information for the wireless device carried by the person at a first location, an association may be made with the person and/or their wireless device at any other location where an A/V recording and communication device records image data (e.g., video) of the same person and/or receives the signal with identifying information for the same wireless device.

In those case where there are numerous A/V recording and communication devices distributed in a geographic area, if the person and/or their wireless device identifying information is associated with an event of interest, such as a crime, the disclosed systems and methods may provide police agencies and others in the geographic area the ability to locate and apprehend the suspect and thereby improve the ability of police to protect the public.

The video data of the person of interest and the identifying information for the wireless device carried by the person may be stored in memory, and may be further processed to provide useful information. For example, the video data may be further processed to identify the person. For instance, using facial recognition technology, faces and/or facial features of people recorded in the video data may be identified by comparison and/or matching with existing databases, which may be publicly-accessible databases like social networks.

Attributes of the signals from the wireless device being carried by the person and/or otherwise associated with the object may be stored in memory, and may be further processed to provide useful information. For example, the signals from the wireless device carried by the person and/or otherwise associated with the object may be further processed to determine the identifying information, and the identifying information determined from the signals may be stored in memory. Determining the identifying information for the wireless device may include decoding information that is encoded in the signal(s) received from the wireless device.

Upon the positive association of a person and/or the wireless device they are carrying with an event of interest and/or an emergency alert, the detection of either the person or the wireless device in the proximity of A/V recording and communication devices in a geographic area may cause associated events to take place. Whether or not these associated events occur may be dependent in whole or in part on the level of permission granted by users of the A/V recording and communication devices for systems not directly associated with the users to access data collected by the A/V recording and communication devices about the object and/or the wireless device. For example, upon the receipt of identifying information from a wireless device known to be associated with a criminal suspect, the A/V recording and communication device and/or a system (e.g., a server) associated and in communication with the A/V recording and communication device may cause a security system to arm at the user's home.

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

In the case of persons recorded in the FOV of a camera of an A/V recording and communication device, the recorded video and/or audio data may provide information supportive of making an affirmative identification of the person. However, in cases where the video data does not include sufficient facial and/or other features, such as voice audio data of the person, it may be difficult to determine the person's identity. Persons, however, are often carrying wireless devices, such as a smartphones, during such times when their video data is captured in the FOV of the camera of an A/V recording and communication device. Such wireless devices may emit wireless signals. These wireless signals emitted from the wireless devices may include identifying information about the wireless devices. Associating identifying information obtained from wireless signal(s) of a wireless device with a particular person of interest can be difficult.

The present embodiments solve these problems by leveraging the functionality of A/V recording and communication devices, such as A/V recording and communication doorbells, to record video data of people and to receive data from wireless devices associated with and in proximity to the recorded people. The wireless signals emitted by the wireless devices may be received by components of the A/V recording and communication device before, during, and/or after the camera of the A/V recording and communication device capturing the video data of the object in the FOV of the camera. The wireless device signal(s) including identifying information for the wireless device may be advantageously received by the A/V recording and communication device and used for identifying and geographically locating objects of interest, such as criminal suspects, even in the absence of video and/or audio data being captured by the A/V recording and communication device. Using centralized and/or distributed computing architectures, the disclosed systems and methods provide added functionality to efficiently and effectively accomplish computationally-intensive operations to identify and/or geographically locate objects of interest, such as criminal suspects, and thereby enhance public safety.

The remaining detailed description describes the present embodiments with reference to the drawings. In the drawings, reference numbers label elements of the present embodiments. These reference numbers are reproduced below in connection with the discussion of the corresponding drawing features.

FIG. 1 illustrates an example system for identifying a wireless device associated with an object in data collected from an A/V recording and communication device. The system shown in FIG. 1 also facilitates geographically locating the object associated with activity of interest based on the data collected from the A/V recording and communication device. In FIG. 1, one or more A/V recording and communication devices 102 are situated in a geographic area (e.g., a neighborhood, a city, etc.). Each A/V recording and communication device 102 has a video camera with a FOV 104. An object 106 in the FOV 104 of the camera may be recorded, and the resulting video data may be transmitted, via a network 108, from the A/V recording and communication device 102 to one or more network-connected devices 110 and/or to one or more client devices 112 of user(s) of the A/V recording and communication device 102.

The object 106 may be a person 114, who may be a pedestrian, or either a driver or passenger of a vehicle 116 (e.g., a car). While the person 114, for example, is present in the FOV 104 of the camera of the A/V recording and communication device 102, he or she may be carrying a wireless device 118. The wireless device 118 (e.g., a smartphone) emits signals that are received by the A/V recording and communication device 102. The signals emitted by the wireless device 118 may be received contemporaneously with the recording of the video data of the object 106 by the camera of the A/V recording and communication device 102. Alternatively, the object 106 and the wireless device 118 associated therewith may be outside the FOV 104 of the camera of the A/V recording and communication device 102, but an antenna of the A/V recording and communication device 102 may be capable of receiving the signals emitted by the wireless device 118 from outside the FOV 104. Multiple persons 114 may be present in the FOV of the camera of the A/V recording and communication device 102. Likewise, where each person 114 of a plurality of persons 114 carries a wireless device 118, multiple signals from multiple wireless devices 118 may be received by the A/V recording and communication device 102.

The signals emitted by the wireless device 118 may include information that can be used to identify the wireless device 118 and/or its owner (e.g., the person 114). As such, the recording of video data of, for example, the person 114 and the contemporaneous receipt of the signal(s) including identifying information for the wireless device 118 provide at least a correlation of the wireless device 118 with the person 114. The correlation of the person 114 with the wireless device 118 may be stronger in cases where no other object 106 besides the person 114 is recorded in image data captured by the camera and signal(s) are contemporaneously received by the A/V recording and communication device 102 from only one wireless device 118.

In cases where a plurality of A/V recording and communication devices 102 are distributed over a geographic area and all record the person 114 and receive the signal(s) containing identifying information for the wireless device 118 over time, the correlation of the person 114 with the wireless device 118 may be stronger. For instance, a first A/V recording and communication device 102 at a first location may record the person 114 and receive a signal with the identifying information for the wireless device 118, and then, at some later time, a second A/V recording and communication device 102 at a second location may record the same person 114 and receive a signal with the identifying information for the same wireless device 118. In this case, the recording of the person 114 and the receipt of signals with the identifying information for the wireless device 118 at two or more locations and at two or more times not only provides a stronger correlation of the person 114 with the wireless device 118, it also provides for geographically locating the person 114 and/or the wireless device 118 in the geographic area. Furthermore, the A/V recording and communication device 102 may be capable of receiving the signal(s) including identifying information from the wireless device 118 even when the object 106 is not in the FOV 104 of the camera. In such cases, detecting the signal(s) that identify a single wireless device 118 being present in a plurality of locations provides useful information for purposes of identifying and/or locating the person 114 of interest even where video data of the person 114 of interest is not available at all the locations.

Where the A/V recording and communication device 102 is located at a residential, commercial, or other building, it may be associated with a security system 120 for the residence, business, or other building. The security system 120 may control a variety of other devices such as alarms, locks, lights, and lines of communication with police and/or other security personnel (e.g., an alarm monitoring center). In some examples, the A/V recording and communication device 102 may be in communication with the security system 120. For example, in response to recording video data of a person 114 and/or receiving one or more signals from a wireless device 118 known to be associated with criminal or other activity of interest, the A/V recording and communication device 102 may cause the security system 120 to arm.

In other examples, the A/V recording and communication device 102 may be in communication with the one more client devices 112 of user(s) of the A/V recording and communication device 102. For example, the user may receive, via a display 124 of the client device 112, the recorded video data of the object 106 (e.g., the person 114 and/or the vehicle 116), along with displayed information notifying the user of additional attributes of the object 106. For instance, a person of interest notification 126 may be provided on the display 124 to alert the user(s) of the A/V recording and communication device 102 of the recording of a person suspected of or associated with a crime or other activity of interest being recorded and/or a wireless device 118 having been identified in the vicinity of the user(s) home or business. In addition to the person of interest notification 126, an activity of interest notification 128 may be provided on the display 124 to provide the user(s) of the A/V recording and communication device 102 additional details as to the nature of any threat posed by the person 114. Based on the person of interest 126 notification and/or the activity of interest 128 notification, the user of A/V recording and communication device 102 may, via sending command signals from the client device 112, control and establish the armed or disarmed status of all or a portion of the features of the security system 120.

In some examples, an administrator system 130 is in communication with the A/V recording and communication device 102, one or more of the network-connected devices 110, and/or the client device(s) 112. The administrator system 130 may be associated with a police agency, for instance, and the ability and/or level of access of the administrator system 130 to use data gathered by the A/V recording and communication device 102 may be dictated by user permission levels. In other examples, providing the administrator system 130 with access to the data provided and/or stored by the A/V recording and communication device 102 and/or the associated data stored, further processed, and/or otherwise maintained by one or more of the network-connected devices 110 facilitates a faster, safer, and/or otherwise more efficient and effective response to an event that may pose a risk to public safety.

In other examples, a system 132 configured to monitor for emergency events is in communication with the A/V recording and communication device 102, one or more of the network-connected devices 110, and/or the client device(s) 112. The system 132 may be associated with a security agency of, for example, a commercial facility. The system 132 may be associated with a monitoring agency for the security system 120. In either of these examples, the system 132 may communicate with and/or provide data and/or data access permissions to a police agency, depending on the level of permission provided by the user(s) of the A/V recording and communication device 102.

Figure 2:
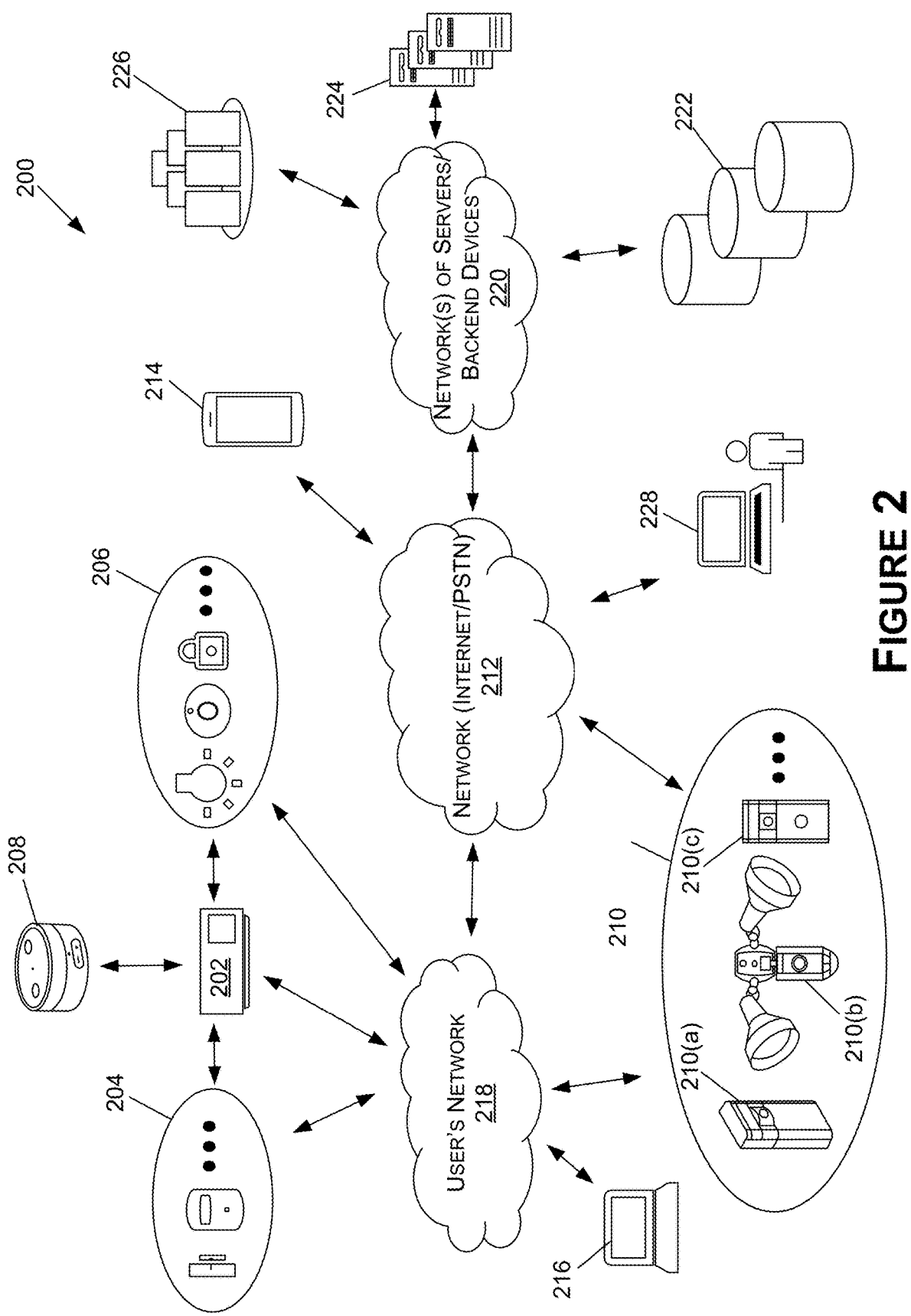
FIG. 2 is a schematic diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enables users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may represent, and/or be similar to, the A/V device 102 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.)

a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 (which may represent, and/or be similar to, the client device 102 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more servers 224, and one or more backend application programming interfaces (APIs) 226. While FIG. 2 illustrates the storage device 222, the server 224, and the API 226 as components separate from the network 220, it is to be understood that the storage device 222, the server 224, and/or the API 226 may be considered to be components of the network 220. For example, the network 220 may include a data center with a plurality of computing resources used to implement the storage device 222, the server 224, and the API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatMl, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, satnav systems, global navigation satellite systems (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the server 224, the API 226, the storage devices 222, etc.) may be referred to herein as a "network device" or "network devices." The network-connected device 110 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of servers/backend devices 220).

Figure 3:
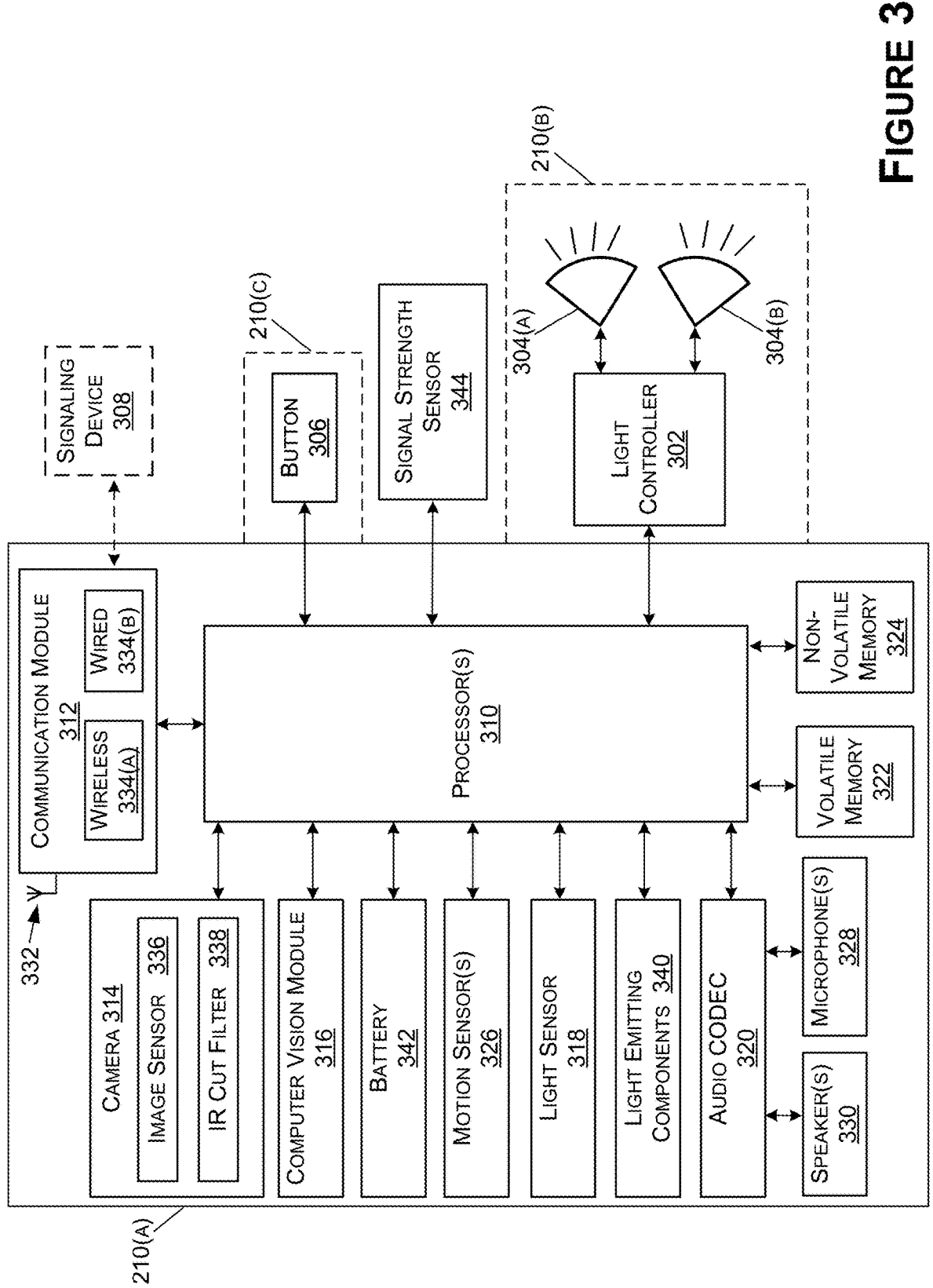
FIG. 3 is a functional block diagram illustrating one example embodiment of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including client device 214, 216 and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b)

connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the server 224 and/or the API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternatively separate from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to ensure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either authorized or not authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
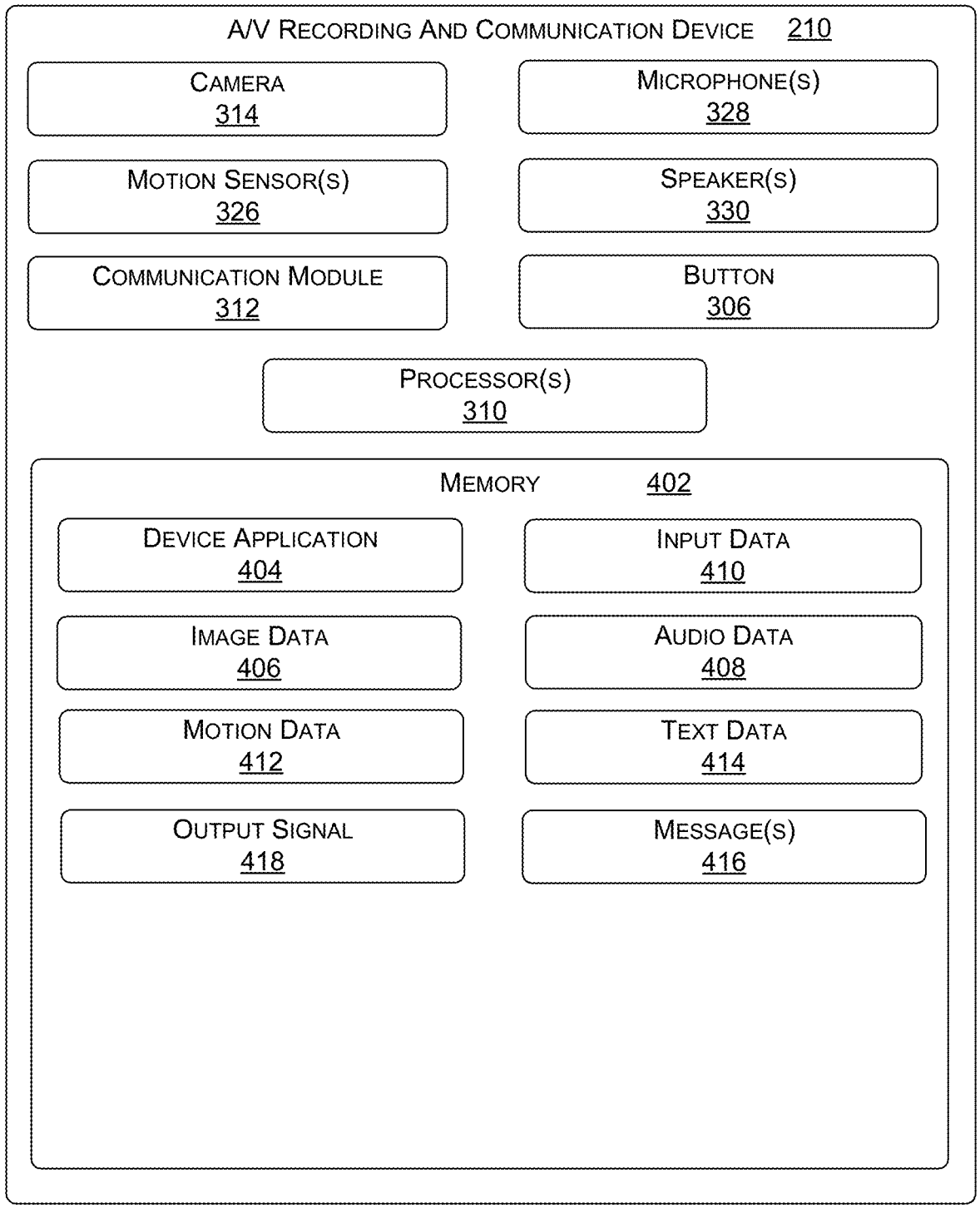
FIG. 4 is a functional block diagram illustrating another example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the server 224, the hub device 202, and/or the client device 214, 216 may be executed by the A/V device 210. For instance, the A/V device 210 may receive and locally store identifying information for the wireless device 118 known to be associated with criminal activity. The A/V device 210 may decode a received signal from the wireless device 118 and determine whether the received signal is from the wireless device 118 known to be associated with criminal activity. Although this function may be performed by the server 224, for example, the A/V device 210 having the ability to perform this function may provide advantages for the disclosed systems and methods including, without limitation, freeing bandwidth and processing resources of the server 224. In the disclosed systems and methods, whether or not various functions may be performed, where available, by the A/V device 210 instead of or in addition to the server 224 may be dictated by the user of the A/V device 210.

Figure 5:
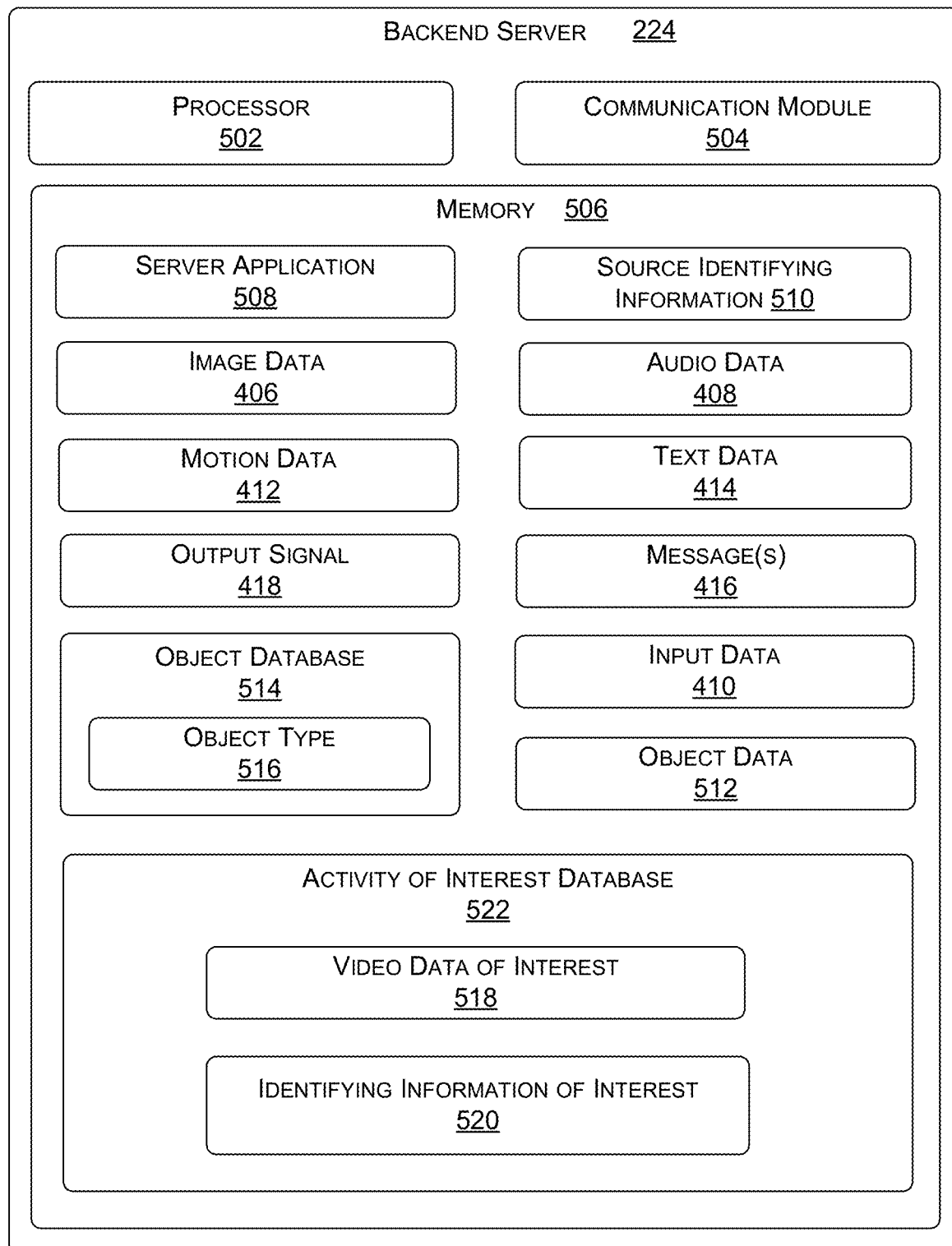
FIG. 5 is a functional block diagram illustrating one example embodiment of a backend device according to various aspects of the present disclosure.

FIG. 5 is a functional block diagram illustrating one embodiment of the server 224 according to various aspects of the present disclosure. The server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the server 224 with reference to the processes described herein, the server 224 may additionally, or alternatively, include one or more of the devices from the network(s) of servers/backend devices 220. For example, the processes described herein with respect to the server 224 may additionally, or alternatively, at least in part, be performed by one or more APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the server 224. For instance, the server 224 may receive and store identifying information for the wireless device 118 known to be associated with criminal activity. The A/V device 210 may relay the signals from the wireless device 118 to the server 224 without first decoding them. The server 224 may decode the encoded signals from the wireless device 118 and determine whether the signal received by the A/V device 210 is from the wireless device 118 known to be associated with criminal activity. Although this function may be performed by the A/V device 210, for example, the server 224 having the ability to perform this function may provide advantages for the disclosed systems and methods including, without limitation, freeing bandwidth and processing resources of the A/V device 210 to focus on recording and transmitting video data at the highest possible quality and at the highest possible transmission speed in cases where the wireless device 118 known to be associated with criminal activity is in the proximity of the A/V device 210. In the disclosed systems and methods, whether or not various functions may be performed, where available, by the server 224 instead of or in addition to the A/V device 210 may be dictated by the user of the A/V device 210.

For example, the server application 508 may configure the processor(s) 502 to analyze the image data 406 in order to determine if the image data 406 depicts an object (e.g., object 106). Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the server 224 may analyze the image data 406 whenever the server 224 receives the image data 406 from the A/V device 210.

In some examples, to analyze the image data 406, computer vision processing and/or image processing, as described herein, for example, may be performed by the processor(s) 502 of the server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person (e.g., person 114). For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle (e.g., vehicle 116).

Based on the comparison, the processor(s) 502 of the server 224 may match the object data 512 from the image data 406 to the image data stored in the object database 514. The processor(s) 502 of the server 224 may then use the match to determine that the object data 512 represents an object and/or to determine the type of object 516 that the object data 512 represents. For example, if the processor(s) 502 of the server 224 matches the object data 512 from the image data 406 to image data stored in the object database 514 that represents a person, then the processor(s) 502 of the server 224 may determine that the image data 406 depicts an object and/or that the image data 406 depicts a person. In some examples, when the object data 512 represents multiple objects, the processor(s) 502 of the server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the server 224, in some embodiments, the image data 406 may be analyzed by any of the A/V recording and communication device 210, the hub device 202, and/or the client device 214, 216 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 512, as described with reference to FIG. 5.

The hub device 202 and/or the server 224 (and/or one or more additional or alternative components of the network(s) of servers/backend devices 220) may alternatively be referred to herein as "network devices."

Figure 6:
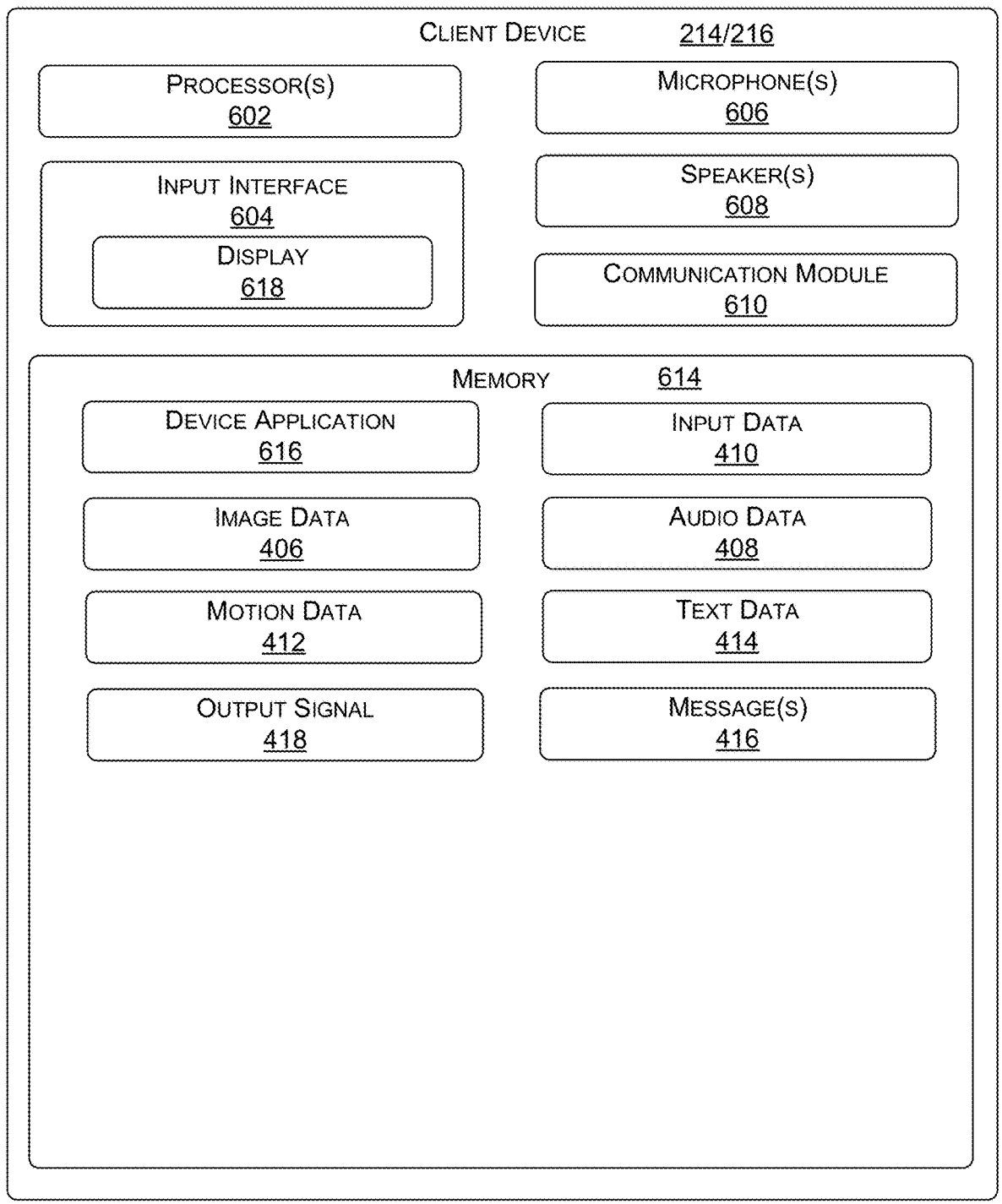
FIG. 6 is a functional block diagram illustrating one example embodiment of a client device according to various aspects of the present disclosure.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604 (e.g., a command by the user of the A/V device 210 to arm the security system 120 associated with the A/V device 210). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the server 224.

With further reference to FIG. 6, the input interface 604 may include a display 618. The display 618 may include a touchscreen, such that the user of the client device 214, 216 may provide inputs directly to the display 618 (e.g., a text message by a user of the A/V device 210 to his or her neighbor indicating that a person of interest 114 was detected in the proximity of the user's A/V device 210). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the server 224 may be executed by the client device 214, 216.

Figure 7:
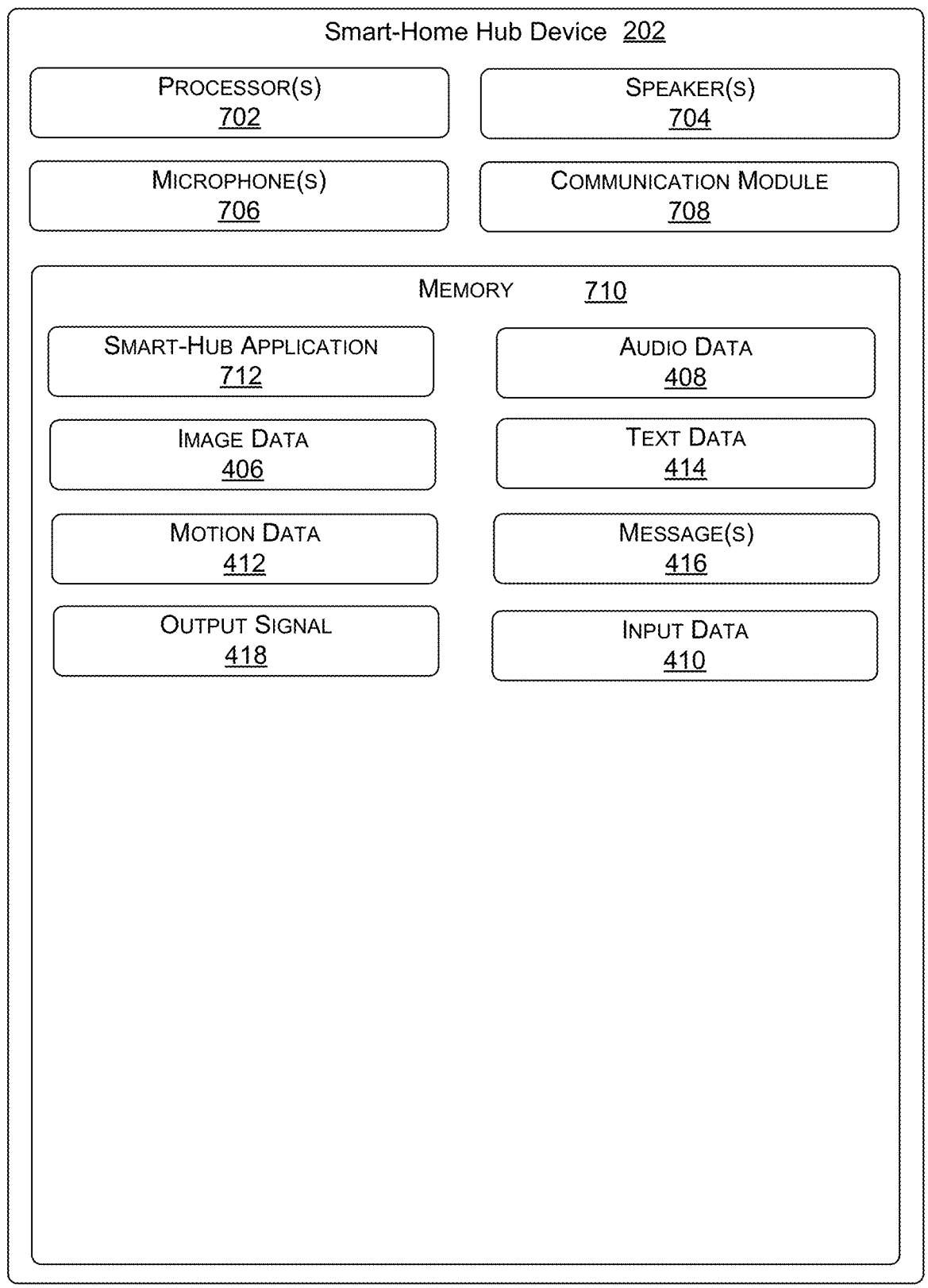
FIG. 7 is a functional block diagram illustrating one example embodiment of a smart-home hub device according to various aspects of the present disclosure.

FIG. 7 is a functional block diagram illustrating an embodiment of the smart-home hub device 202 according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the server 224, and/or an additional electronic device (e.g., a second A/V device 210, the automation device(s) 206, the sensor(s) 204, etc.).

As described herein, at least some of the processes of the A/V device 210, the server 224, and/or the client device 214, 216 may be executed by the hub device 202. For instance, the hub device 202 may receive and store identifying information for the wireless device 118 known to be associated with criminal activity. The A/V device 210 may relay the signals from the wireless device 118 to the hub device 202 without first decoding them. The hub device 202 may decode the encoded signals from the wireless device 118 and determine whether the signal received by the A/V device 210 is from the wireless device 118 known to be associated with criminal activity. Although this function may be performed by the A/V device 210, for example, the hub device 202 having the ability to perform this function may provide advantages for the disclosed systems and methods including, without limitation, freeing bandwidth and processing resources of the A/V device 210 to focus on recording and transmitting video data at the highest possible quality and at the highest possible transmission speed in cases where the wireless device 118 known to be associated with criminal activity is in the proximity of the A/V device 210. In the disclosed systems and methods, whether or not various functions may be performed, where available, by the hub device 202 instead of or in addition to the A/V device 210 may be dictated by the user of the A/V device 210.

Figure 8:
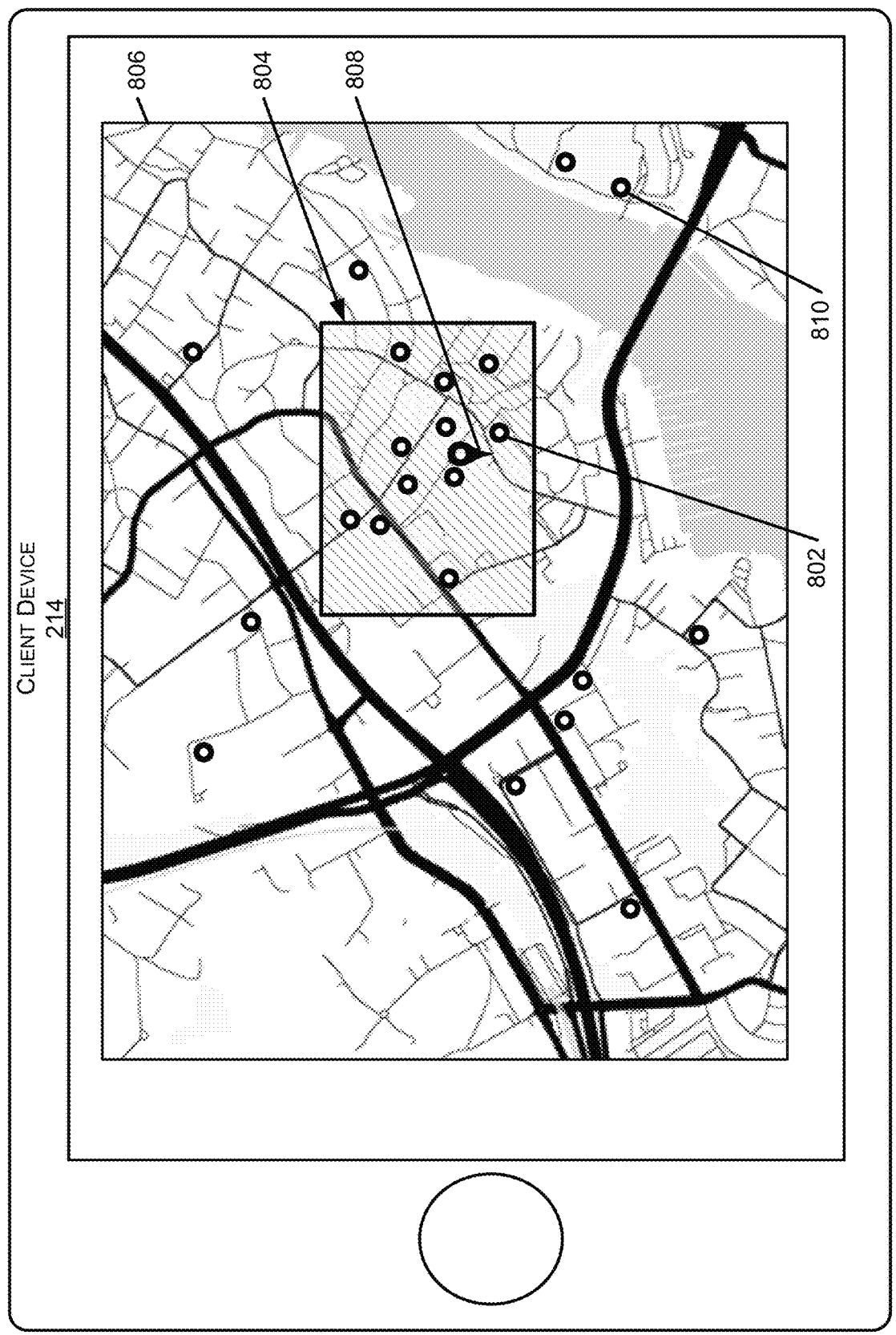
FIG. 8 illustrates an example of a geographic network, according to various aspects of the present disclosure.

FIG. 8 illustrates an example of a geographic network of users, according to various aspects of the present disclosure. In some examples, a geographic network may be executed by a geographic network platform, such as a geographic network platform operating on the server 224 and/or one or more other or additional components of the network of servers/backend devices 220. As such, the server 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods® or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data 406, audio data 408, text data 414, input data 410, motion data 412, and/or other data from the user's A/V device 210 and/or the user's client device 214, 216) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area for which the user is verified. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the server 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allows a user of the geographic network to post videos, photos, text, and/or other data to alert other members of possible activity of interest (e.g., criminal activity) in a geographic area. Additionally, or alternatively, news items, police-sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the server 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 8, a portion of the geographic network is shown. With reference to FIG. 8, and during a setup or registration process with the geographic network, the location 808 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), etc.). In some examples, the user may then be associated with the geographic area 804 of the geographic network, such as based on the neighborhood, town, city, zip code, state, country, or other area in which the user is located. In one example, the geographic area 804 may be the town in which the location 808 associated with the user is located. In other examples, the user may define, on the map 806, the geographic area 804 of the geographic network that the user wishes to have access to content, which may include the location 808 associated with the user. To define the geographic area 804, the user may overlay a predefined shape on the map 806 (e.g., a rectangle, as shown, a circle, a triangle, a square, a polygon, etc.), may position any number of vertices to define a polygon on the map 806, may define a radius about the location 808 associated with the user, may draw the geographic area 804 on the map, etc. The geographic network may limit the size of the geographic area 804 for the user. The size may be limited to a maximum distance in any direction from the location 808 (e.g., a radius) associated with the user of less than, for example and without limitation, two miles, five miles, ten miles, fifteen miles, fifty miles, or the like.

Although the geographic area 804 includes the geographic network from which the user may desire to view content, the content shared by the user may be shared with a larger, smaller, and/or different geographic area of the geographic network than the geographic area 804. For example, the geographic area 804 may include the geographic area in which the user can view content, but any users located within the entire portion of the map 806 displayed on the client device 214 may be able to view content shared by the user of the client device 214 (e.g., depending on the geographic areas defined by and/or associated with the other users located within the portion of the map 806). For example, users of the geographic network having associated location(s) 810 outside of the geographic area 804 may be able to view the content shared by the user of the client device 214, but the user of the client device 214 may not be able to view, or may choose not to view (e.g., by defining the geographic area 804 that does not include the locations 810), the content shared by the user(s) associated with the location(s) 810. In other examples, the geographic area 804 from which the user of the client device 214 desires to view content may also be the same geographic area 804 in which users can view content shared by the user of the client device 214. For example, where the geographic area 804 is a town, each of the users located within the town may only be able to view and share content with each other user located in the town. As another example, where the geographic area 804 is defined by the user of the client device 214, the user of the client device 214 may only be able to view content by the users who are located within the geographic area 804 and the users within the geographic area 804 may be the only users that can view content shared by the user of the client device 214.

With further reference to FIG. 8, and during use of the geographic network platform by the user of the client device 214, the user may access a GUI on the client device 214

(e.g., within a mobile or web application). The user may desire to view shared content from users of the geographic area 804 of the geographic network. As such, the icons illustrating the locations 802 may be included within the geographic area 804 because data generated by client devices and/or A/V devices of users associated with the locations 802 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the server 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 806.

Each of the processes described herein, including the processes 900, 1000, 1100, 1200, 1300, 1400, 1500, 1600, and 1700, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 9:
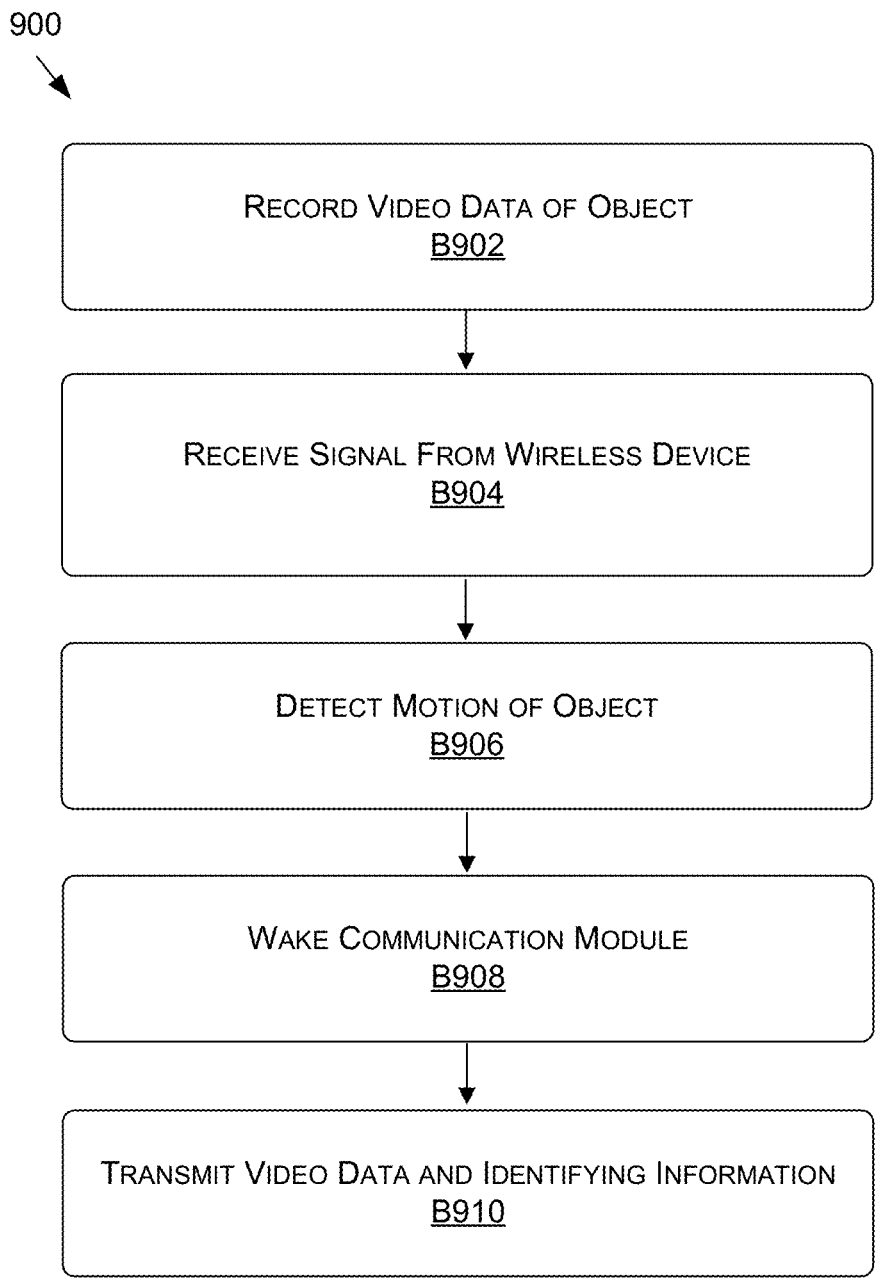
FIG. 9 is a flowchart illustrating an example process for identifying a wireless device in data collected from an A/V recording and communication device, according to various aspects of the present disclosure.

FIG. 9 is a flowchart illustrating an example process 900 for identifying a wireless device in data collected from an A/V recording and communication device, according to various aspects of the present disclosure. The process 900, at block B902, records video data of an object 106 in the FOV of the camera 314. For example, an A/V recording and communication device (e.g., the A/V device 210) may record, using the camera 314, video data of a person 114 within the FOV of the A/V device 210 (e.g., an FOV of the camera 314 and/or an FOV of the motion sensor(s) 326). In some examples, the person 114 or other object 106 may have a wireless device 118 associated with it, and the wireless device 118 may be proximate the person 114 or other object 106. For example, the person 114 may be carrying the wireless device 118 during such time when he or she is in the FOV of the camera 314 and/or the FOV of the motion sensor(s) 326.

The process 900, at block B904, receives at least one signal from the wireless device 118. For example, the A/V device 210 may receive, using the communication module 312, at least one signal from the wireless device 118 being carried by a person 114 within the FOV of the A/V device 210). In some examples, the signal(s) from the wireless device 118 include(s) identifying information for the wireless device 118. In various embodiments, the A/V device 210 may receive more than one signal from the wireless device 118. For simplicity, however, various embodiments described herein may use the singular form "signal." It is to be understood that use of the singular form does not imply exclusion of instances in which the A/V device 210 receives more than one signal from the wireless device 118.

In some embodiments, the process 900, at block B906, detects, by the motion sensor(s) 326, motion of the object 106. In some examples, the process 900, at block B908, wakes the communication module 312 of the A/V device 210 from a passive state to begin receiving the signal from the wireless device 118.

The process 900, at block B910, transmits the video data and the identifying information for the wireless device to a network-connected device 110. For example, the A/V device 210 may transmit, using the communication module 312, the video data and the identifying information to the network-connected device 110. In some embodiments, the network-connected device 110 is the hub device 202, and the process 900, at block B910, transmits the video data and the identifying information to the hub device 202. The hub device 202 may, in turn, transmit the video data and the identifying information to the server 224. In other embodiments, the network-connected device 110 is the server 224, and the process 900, at block B910, transmits the video data and the identifying information to the server 224. In some embodiments, the network-connected device(s) 110 is/are the client device(s) 214, 216, and the process 900, at block B910, transmits the video data and the identifying information to the client device(s) 214, 216.

In some examples, block B910 of the process 900 may include transmitting the video data to the network-connected device 110, and then transmitting the identifying information for the wireless device 118 to the network-connected device 110 after transmitting the video data to the network-connected device 110. In other examples, block B910 of the process 900 may include transmitting the identifying information for the wireless device 118 to the network-connected device 110, and then transmitting the video data to the network-connected device 110 after transmitting the identifying information to the network-connected device 110. In some examples, block B910 of the process 900 may include transmitting the identifying information for the wireless device 118 to the network-connected device 110 substantially simultaneously with transmitting the video data to the network-connected device 110.

In other examples, the process 900 may include storing the signal(s) from the wireless device 118 in a memory (e.g., the volatile memory 322 and/or the non-volatile memory 324) of the A/V device 210. In some examples, the signal(s) from the wireless device 118 is/are encoded, and the process 900 may include decoding the signal(s). In these embodiments, after decoding the signal from the wireless device 118, the process 900 may include storing the decoded signal in the volatile memory 322 and/or the non-volatile memory 324 of the A/V device 210. In other examples, the signal from the wireless device 118 includes at least one of: a Bluetooth signal, a Bluetooth-low energy signal, a WiFi signal, and a Zigbee signal. In other examples, the signal includes a media access control (MAC) address of the wireless device 118. In these embodiments, the MAC address of the signal may be included either in addition to or instead of the at least one of: the Bluetooth signal, the Bluetooth-low energy signal, the WiFi signal, and the Zigbee signal. In some examples, the signal includes a service set identifier (SSID). In other examples, the signal includes manufacturer-specific information for the wireless device 118. For example, the manufacturer-specific information included in the signal from the wireless device 118 may facilitate identifying the brand and/or model of the wireless device 118.

In other examples, the process 900 may include storing the video data in the volatile memory 322 and/or the non-volatile memory 324 of the A/V device 210. In some examples, the process 900 may include determining, by the processor 310, a direction of movement of the object 106 based, at least in part, on the video data. In other examples, the process 900 may include determining, by the processor 310, a speed of movement of the object 106 based, at least in part, on the video data.

In some examples, in the process 900, the object 106 is or includes a person 114. In other examples, where the object 106 is a person 114, the person 114 may be a criminal suspect or a crime victim. In some examples, the object 106 includes a pet. In other examples, the object 106 includes a vehicle 116. In other examples, where the object 106 includes a vehicle 116, the vehicle 116 may include the criminal suspect and/or the crime victim as a driver and/or passenger of the vehicle 116.

In other examples, the process 900 may include determining a signal strength of the wireless device 118 received by the communication module 312 of the A/V device 210. In the process 900, determining the signal strength of the wireless device 118 may include acquiring signal strength data using a signal strength sensor 344 of the A/V device 210. For example, the wireless device 118 signal strength may be determined by at least one of the communication module 312 and/or the processor(s) 310 of the A/V device 210 based, at least in part, on the acquired signal strength data. In these embodiments, the process 900 may include ignoring the signal from the wireless device 118 in response to the determined signal strength being less than a predetermined signal strength. Ignoring the signal from the wireless device 118 may include the communication module 312 and/or the processor(s) 310 taking no additional action and performing no further steps in the process 900, at least with respect to the signal received, at block B904, from the wireless device 118.

Figure 10:
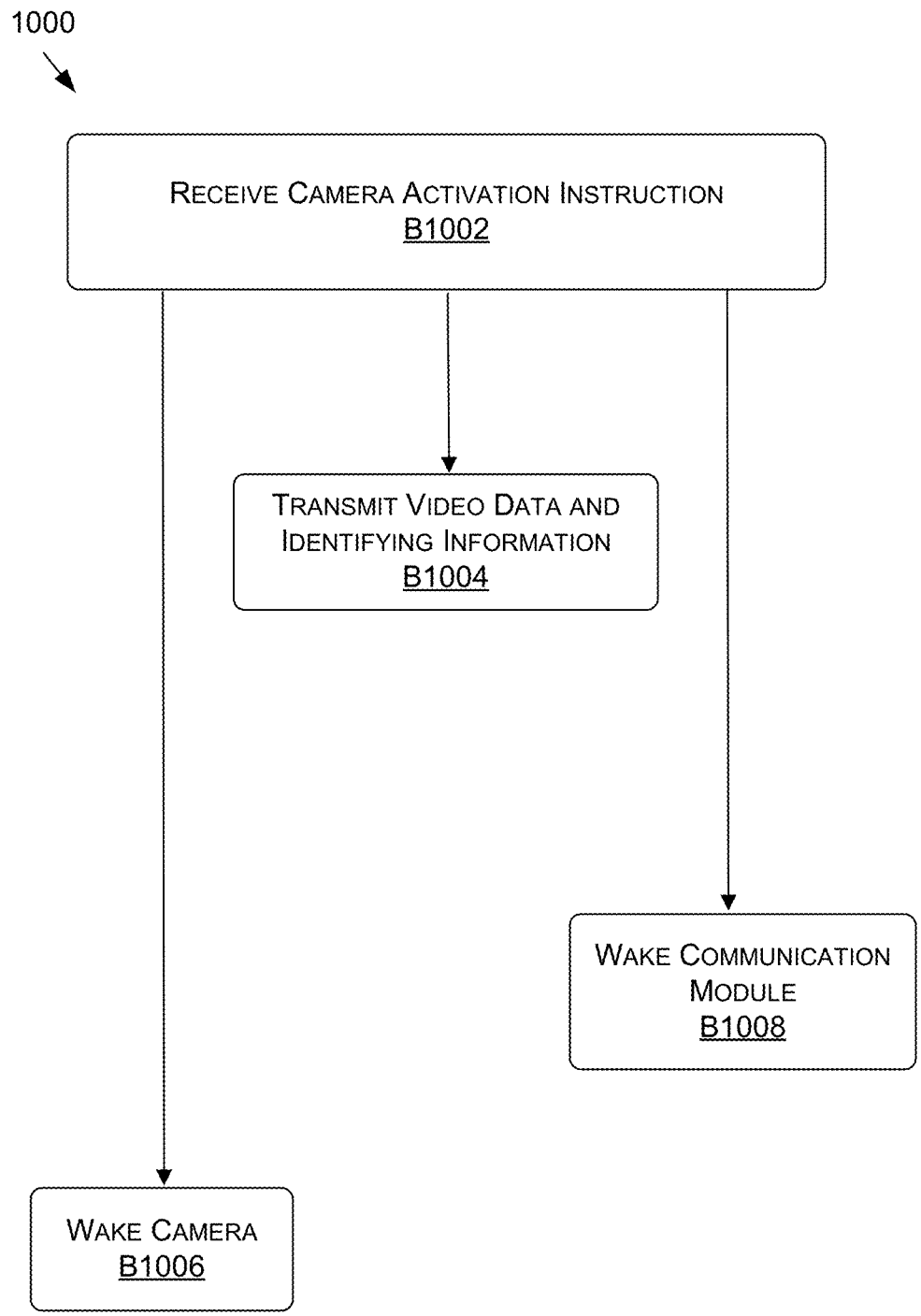
FIG. 10 is a flowchart illustrating an example aspect of the process shown in FIG. 9, according to various aspects of the present disclosure.

FIG. 10 is a flowchart illustrating an example aspect of the process 900 shown in FIG. 9, according to various aspects of the present disclosure. One or more of the blocks shown in FIG. 10 may be performed by the A/V device 210 upon the occurrence of an event such as a criminal suspect or the suspect's wireless device 118 being identified in the geographic area of the A/V device 210 (e.g., by one or more neighboring A/V device(s) 210). For example, the process 1000, at block B1002, receives a camera activation instruction sent from the network-connected device 110. In some examples, the camera activation instruction is sent from the network-connected device 110 to the communication module 312 of the A/V device 210, and thus received by the A/V device 210, in response to a notification of an occurrence of an event. For example, the network-connected device 110 may receive the notification of an event involving the object 106 and/or the wireless device 118 associated with the object 106. In some examples, where the object 106 is a criminal suspect, the event may include a commission of a crime and the notification of the event may include a report of the crime and/or the report thereof having occurred.

In some examples, the camera activation instruction may include pre-identified wireless device identifier data associated with the occurrence of the event. For example, a criminal suspect may be known to be carrying a wireless device 118 having one or more known wireless signal characteristics. Where such wireless signal characteristics may function as pre-identified wireless device identifier data, providing it to the A/V device 210 and/or the network-connected device 110 may facilitate identifying and locating the wireless device 118 and the object 106 of interest associated therewith using the disclosed systems and methods.

The process 1000, at block B1004, transmits the video data and the identifying information for the wireless device to the network-connected device 110 in response to receiving the camera activation instruction. Referring again to FIG. 9, block B1004 may be performed in the process 1000 after blocks B902 and B904 are performed in the process 900. For example, the communication module 312 of the A/V device 210 transmits the video data and the identifying information to the network-connected device 110 in response to receiving, by the communication module 312, the camera activation instruction from the network-connected device 110.

The process 1000, at block B1006, wakes the camera 314 of the A/V device 210 in response to receiving the camera activation instruction. Referring again to FIG. 9, block B1006 may be performed in the process 1000 prior to block B902 being performed in the process 900. For example, in response to receiving, by the communication module 312, the camera activation instruction from the network-connected device 110, the processor(s) 310 of the A/V device 210 may wake the camera 314 from a passive state to begin recording the video data. The process 1000, at block B1008, wakes the communication module 312 of the A/V device 210 in response to receiving the camera activation instruction. Referring again to FIG. 9, block B1008 may be performed in the process 1000 prior to block B904 being performed in the process 900. For example, in response to receiving, by the communication module 312, the camera activation instruction from the network-connected device 110, the processor(s) 310 of the A/V device 210 may wake the communication module 312 from a passive state to begin receiving the signal from the wireless device 118.

In some examples, the process 900 and/or the process 1000 may include causing the camera 314 to record the video data at a higher resolution in the presence of one or more predetermined conditions, as compared to a lower resolution recorded in the absence of the one or more predetermined conditions. In the process 900, for example, in response to receiving, by the communication module 312, the camera activation instruction from the network-connected device 110, the processor(s) 310 of the A/V device 210 cause the camera 314 to record the video data at the higher resolution, as compared to a lower resolution recorded in the absence of receiving the camera activation instruction from the network-connected device 110. In this example for the process 900, the one or more predetermined conditions may include the communication module 312 receiving the camera activation instruction from the network-connected device 110.

Receipt of wireless device identifier data may also serve as a condition for recording video data at higher resolution. Thus, in response to receiving, by the communication module 312, the pre-identified wireless device identifier data from the wireless device 118, the processor(s) 310 of the A/V device 210 may cause the camera 314 to record the video data at the higher resolution, as compared to the lower resolution recorded in the absence of receiving the pre-identified wireless device identifier data from the wireless device 118.

In other examples, the process 900 and/or the process 1000 may include causing the communication module 312 to transmit the identifying information for the wireless device 118 to the network-connected device 110 using a first sequence in the presence of the one or more predetermined conditions, as compared to using a second sequence in the absence of the one or more predetermined conditions. In the process 900, for example, in response to receiving, by the communication module 312, the camera activation instruction from the network-connected device 110, the processor(s) 310 of the A/V device 210 may cause the communication module 312 to transmit the identifying information for the wireless device 118 to the network-connected device 110 (e.g., after transmitting the video data). Referring again to FIG. 9, in this example for the process 900, blocks B902 and B904 are performed after B1002 is performed in the process 1000. Also, in this example for the process 900, in the absence of receiving the camera activation instruction from the network-connected device 110, the processor(s) 310 of the A/V device 210 may cause the communication module 312 to transmit the identifying information for the wireless device 118 to the network-connected device 110 before or concurrently with transmitting the video data. Also, in this example for the process 900, the one or more predetermined conditions may include the communication module 312 receiving the camera activation instruction from the network-connected device 110.

In the process 1000, for example, in response to receiving, by the communication module 312, the pre-identified wireless device identifier data from the wireless device 118, the processor(s) 310 of the A/V device 210 may cause the communication module 312 to transmit the identifying information for the wireless device 118 to the network-connected device 110 after transmitting the video data. In this example for the process 1000, in the absence of receiving the pre-identified wireless device identifier data from the wireless device 118, the processor(s) 310 of the A/V device 210 may cause the communication module 312 to transmit the identifying information for the wireless device to the network-connected device 110 before or concurrently with transmitting the video data. Also, in this example for the process 1000, the one or more predetermined conditions may include the communication module 312 receiving the pre-identified wireless device identifier data from the wireless device 118.

In some examples, the process 900 and/or the process 1000 may include causing the communication module 312 to transmit the video data to the network-connected device 110 using a greater bandwidth in the presence of the one or more predetermined conditions, as compared to using a lesser bandwidth in the absence of the one or more predetermined conditions. In the process 900, for example, in response to receiving, by the communication module 312, the camera activation instruction from the network-connected device 110, the processor(s) 310 of the A/V device 210 may cause the communication module 312 to transmit the video data to the network-connected device 110 using the greater bandwidth. In this example for the process 900, in the absence of receiving the camera activation instruction from the network-connected device 110, the processor(s) 310 of the A/V device 210 may cause the communication module 312 to transmit the video data to the network-connected device 110 using the lesser bandwidth. Also, in this example for the process 900, the one or more predetermined conditions may include the communication module 312 receiving the camera activation instruction from the network-connected device 110.

In the process 1000, for example, in response to receiving, by the communication module 312, the pre-identified wireless device identifier data from the wireless device 118, the processor(s) 310 of the A/V device 210 may cause the communication module 312 to transmit the video data to the network-connected device 110 using the greater bandwidth. In this example for the process 1000, in the absence of receiving the pre-identified wireless device identifier data from the wireless device 118, the processor(s) 310 of the A/V device 210 may cause the communication module 312 to transmit the video data to the network-connected device 110 using the lesser bandwidth. Also, in this example for the process 1000, the one or more predetermined conditions may include the communication module 312 receiving the pre-identified wireless device identifier data from the wireless device 118.

In other examples, the process 900 and/or the process 1000 may include causing a security system 120 associated with the A/V device 210 to arm in the presence of the one or more predetermined conditions, as compared to maintaining security system 120 in a disarmed and/or other functional state different from an armed state in the absence of the one or more predetermined conditions. In the process 900, for example, in response to receiving, by the communication module 312, the camera activation instruction from the network-connected device 110, the processor(s) 310 of the A/V device 210 may cause the security system 120 associated with the A/V device 210 to arm. For example, referring to FIG. 2, the A/V device 210 may transmit an instruction to a smart home hub device 202, which is implemented as a security system hub, to arm the security system. Additionally, or alternatively, a server or other device may transmit an instruction to the smart home hub 202 to arm the security system in conjunction with sending the camera activation instruction to the A/V device 210. In this example for the process 900, in the absence of receiving the camera activation instruction from the network-connected device 110, the processor(s) 310 of the A/V device 210 may cause the security system 120 associated with the A/V device 210 to be maintained in a disarmed and/or other functional state different from an armed state. Also, in this example for the process 900, the one or more predetermined conditions may include the communication module 312 receiving the camera activation instruction from the network-connected device 110.

In the process 1000, for example, in response to receiving, by the communication module 312, the pre-identified wireless device identifier data from the wireless device 118, the processor(s) 310 of the A/V device 210 may cause the security system 120 associated with the A/V device 210 to arm. In this example for the process 1000, in the absence of receiving the pre-identified wireless device identifier data from the wireless device 118, processor(s) 310 of the A/V device 210 may cause the security system 120 associated with the A/V device 210 to be maintained in a disarmed and/or other functional state different from an armed state. Also, in this example for the process 1000, the one or more predetermined conditions may include the communication module 312 receiving the pre-identified wireless device identifier data from the wireless device 118.

In some examples, the process 900 and/or the process 1000 may include causing the communication module 312 to transmit an alert to the client device(s) 214, 216 associated with the A/V device 210 in the presence of the one or more predetermined conditions, as compared to the alert not being transmitted to the client device(s) 214, 216 in the absence of the one or more predetermined conditions. In the process 900, for example, in response to receiving, by the communication module 312, the camera activation instruction from the network-connected device 110, the processor(s) 310 of the A/V device 210 may cause the communication module 312 to transmit, to the client device(s) 214, 216, the alert indicating the receipt of the camera activation instruction. In this example for the process 900, in the absence of receiving the camera activation instruction from the network-connected device 110, the processor(s) 310 of the A/V device 210 may not cause the communication module 312 to transmit the alert to the client device(s) 214, 216. Also, in this example for the process 900, the one or more predetermined conditions may include the communication module 312 receiving the camera activation instruction from the network-connected device 110.

In the process 1000, for example, in response to receiving, by the communication module 312, the pre-identified wireless device identifier data from the wireless device 118, the processor(s) 310 of the A/V device 210 may cause the communication module 312 to transmit, to the client device(s) 214, 216, the alert indicating the receipt of the pre-identified wireless device identifier data. In this example for the process 1000, in the absence of receiving the pre-identified wireless device identifier data from the wireless device 118, the processor(s) 310 of the A/V device 210 may not cause the communication module 312 to transmit the alert to the client device(s) 214, 216. Also, in this example for the process 1000, the one or more predetermined conditions may include the communication module 312 receiving the pre-identified wireless device identifier data from the wireless device 118. In these examples for the process 900 and the process 1000, transmitting the alert to the client device(s) 214, 216 associated with the A/V device 210 may provide a user and/or other people associated with and authorized by the user to exercise additional caution and heightened security practices around such times when a criminal suspect or other person of interest is detected as being in close proximity to a user's home having A/V device 210. Also, in these examples, the alert may provide the user and/or the other people associated with and authorized by the user an ability to obtain information about the person of interest and to maintain a heightened awareness of their surroundings, including to identify the person(s) and to report on and/or warn others of the whereabouts of the person(s) of interest.

In other examples, the process 900 and/or the process 1000 may include causing the communication module 312 to transmit an alert to a system 122 configured to monitor for emergency events in the presence of the one or more predetermined conditions, as compared to the alert not being transmitted to the system 122 configured to monitor for emergency events in the absence of the one or more predetermined conditions. In the process 900, for example, in response to receiving, by the communication module 312, the camera activation instruction from the network-connected device 110, the processor(s) 310 of the A/V device 210 may cause the communication module 312 to transmit, to the system 122 configured to monitor for emergency events, the alert indicating the receipt of the camera activation instruction. In this example for the process 900, in the absence of receiving the camera activation instruction from the network-connected device 110, the processor(s) 310 of the A/V device 210 may not cause the communication module 312 to transmit the alert to the system 122 configured to monitor for emergency events. Also, in this example for the process 900, the one or more predetermined conditions may include the communication module 312 receiving the camera activation instruction from the network-connected device 110.

In the process 1000, for example, in response to receiving, by the communication module 312, the pre-identified wireless device identifier data from the wireless device 118, the processor(s) 310 of the A/V device 210 may cause the communication module 312 to transmit, to the system 122 configured to monitor for emergency events, the alert indicating the receipt of the pre-identified wireless device identifier data. In this example for the process 1000, in the absence of receiving the pre-identified wireless device identifier data from the wireless device 118, the processor(s) 310 of the A/V device 210 may not cause the communication module 312 to transmit the alert to the system 122 configured to monitor for emergency events. Also, in this example for the process 1000, the one or more predetermined conditions may include the communication module 312 receiving the pre-identified wireless device identifier data from the wireless device 118. In these examples for the process 900 and the process 1000, transmitting the alert to the system 122 configured to monitor for emergency events may provide a police agency and/or other interested parties additional tools and functionality to facilitate locating and/or apprehending a person of interest, such as a criminal suspect. Also, in these examples, the alert may provide the police agency and/or other interested parties an ability to obtain information about the person of interest and to maintain a heightened awareness of their surroundings, including to identify the person and to report on and/or warn others of the whereabouts of the person(s) of interest.

In some examples, the process 900 and/or the process 1000 may be implemented for a plurality of A/V devices 210, including a first A/V device 210 at a first location and having a first communication module 312, and including a second A/V device 210 at a second location and having a second communication module 312. In these implementations, the first A/V device 210 has a first camera 314, and the second A/V device 210 has a second camera 314. The second A/V device 210 may be located within a predetermined distance of the first A/V device 210. In some examples, the predetermined distance between the first and second A/V devices 210 may correspond to a radius of a circle drawn on a map around the first A/V device 210. In other embodiments, the predetermined distance between the first and second A/V devices 210 may correspond to a distance between the first and second A/V devices 210 by streets and/or sidewalks, as shown, for example, in the geographic network of users in FIG. 8. In these embodiments, the predetermined distance for a particular A/V device 210 (e.g. the first A/V device 210) to two or more other A/V devices 210 (e.g., second A/V devices 210) may vary based on the respective locations of the two or more A/V devices 210 in the geographic network of users (e.g., the neighborhood) shown in FIG. 8. The specification (e.g., by user(s) of the network-connected device(s) 110 and/or the administrator system 130) of predetermined distance(s) in the disclosed systems and methods provides for a realistically bound operational area defined, for instance, by the amount of time it would take the object 106 of interest (e.g., the person 114 and/or the vehicle 116) to reach the second A/V device 210 after being detected at the location of the first A/V device 210. For example, if a criminal suspect person 114 or his or her wireless device 118 is identified at the location of the first A/V device 210, sufficient time may be given to user(s) of the at least a second A/V device 210 before the arrival of the suspect at their locations.

The process 900 and/or the process 1000 may include causing the second communication module 312 of at least the second A/V device 210 to wake from a passive state to begin receiving the signal including the identifying information from the wireless device 118. For example, in the process 900 and/or the process 1000, the second communication module 312 of at least the second A/V device 210 may be awoken in the presence of the one or more predetermined conditions being met for the first A/V device 210, as compared to the at least the second A/V device 210 not being awoken in the absence of the one or more predetermined conditions. The one or more predetermined conditions may include the second A/V device 210 being located within the predetermined distance of the first A/V device 210. In some examples, location data (e.g., satnav (e.g., GPS) coordinates within, for instance, the geographic network of users shown in FIG. 8) for the first and the at least a second A/V devices 210 are stored in the memory 506 of the server 224. In these embodiments, the processor 502 of the server 224 may determine that the at least a second A/V device 210 is located within the predetermined distance from the location of the first A/V device 210. In other examples, the location data for the first and the at least a second A/V devices 210 is stored in the volatile memory 322 and/or the non-volatile memory 324 of A/V devices 210. In these embodiments, the processor(s) 310 of the first A/V device 210 may determine that the at least a second A/V device 210 is located within the predetermined distance from the location of the first A/V device 210.

The one or more predetermined conditions may include the second A/V device 210 being located within the predetermined distance of the first A/V device 210. In the process 900, for example, in response to receiving, by the first communication module 312 of the first A/V device 210, the camera activation instruction from the network-connected device 110, the processor(s) 310 of the first A/V device 210 may cause the processor(s) 310 of the second A/V device 210 to wake the second communication module 312 of the at least the second A/V device 210 to begin receiving the signal including the identifying information from the wireless device 118. In this example for the process 900, in the absence of receiving the camera activation instruction from the network-connected device 110, the processor(s) 310 of the first A/V device 210 may not cause the processor(s) 310 of the second A/V device 210 to wake the second communication module 312 of the at least the second A/V device 210 to begin receiving the signal including the identifying information from the wireless device 118. Also, in this example for the process 900, the one or more predetermined conditions may include the first communication module 312 of the first A/V device 210 receiving the camera activation instruction from the network-connected device 110.

In the process 1000, for example, in response to receiving, by the first communication module 312 of the first A/V device 210, the pre-identified wireless device identifier data from the wireless device 118, the processor(s) 310 of the first A/V device 210 may cause the processor(s) 310 of the second A/V device 210 to wake the second communication module 312 of the at least the second A/V device 210 to begin receiving the signal including the identifying information from the wireless device 118. In this example for the process 1000, in the absence of receiving the pre-identified wireless device identifier data from the wireless device 118, the processor(s) 310 of the first A/V device 210 may not cause the processor(s) 310 of the second A/V device 210 to wake the second communication module 312 of the at least the second A/V device 210 to begin receiving the signal including the identifying information from the wireless device 118. Also, in this example for the process 1000, the one or more predetermined conditions may include the first communication module 312 of the first A/V device 210 receiving the pre-identified wireless device identifier data from the wireless device 118.

In other examples, the process 900 and/or the process 1000 may include causing the first and second communication modules 312 of the first and at least the second A/V devices 210 to transmit locations of their respective cameras 314 to the network-connected device 110 to facilitate locating the object 106 of interest. For example, in the process 900 and/or the process 1000, the first and second communication modules 312 may transmit the locations of their respective cameras 314 to the network-connected device 110 in the presence of the one or more predetermined conditions being met for the first A/V device 210, as compared to the first and second communication modules 312 not transmitting the locations in the absence of the one or more predetermined conditions. In the process 900, for example, in response to receiving, by the first communication module 312 of the first A/V device 210, the camera activation instruction from the network-connected device 110, the first communication module 312 transmits the location of the first A/V device 210 to the network-connected device 110, and the processor(s) 310 of the first A/V device 210 may cause the second communication module 312 of the second A/V device 210 to transmit the camera location of the second A/V device 210 to the network-connected device 110. In this example for the process 900, in the absence of receiving the camera activation instruction from the network-connected device 110, the first communication module 312 does not transmit the location of the first A/V device 210 to the network-connected device 110, and the processor(s) 310 of the first A/V device 210 may not cause the second communication module 312 of the second A/V device 210 to transmit the camera location of the second A/V device 210 to the network-connected device 110. Also, in this example for the process 900, the one or more predetermined conditions may include the first communication module 312 of the first A/V device 210 receiving the camera activation instruction from the network-connected device 110.

In the process 1000, for example, in response to receiving, by the first communication module 312 of the first A/V device 210, the pre-identified wireless device identifier data from the wireless device 118, the first communication module 312 may transmit the location of the first A/V device 210 to the network-connected device 110, and the processor(s) 310 of the first A/V device 210 may cause the second communication module 312 of the second A/V device 210 to transmit the camera location of the second A/V device 210 to the network-connected device 110. In this example for the process 1000, in the absence of receiving the pre-identified wireless device identifier data from the wireless device 118, the first communication module 312 does not transmit the location of the first A/V device 210 to the network-connected device 110, and the processor(s) 310 of the first A/V device 210 may not cause the second communication module 312 of the second A/V device 210 to transmit the camera location of the second A/V device 210 to the network-connected device 110. Also, in this example for the process 1000, the one or more predetermined conditions may include the first communication module 312 of the first A/V device 210 receiving the pre-identified wireless device identifier data from the wireless device 118. These examples for the process 900 and the process 1000 are applicable in cases where the current location of the first and/or the second A/V devices 210 is not already known (e.g., stored in memory device(s) of) network-connected device 110. In such cases, transmitting the locations of the first and second A/V devices 210 to the network-connected device 110 may provide the police agency and/or the other interested parties data for purposes of geographically locating the object 106 or person 114 of interest.

In some examples, the process 900 and/or the process 1000 may include causing the second camera 314 of the second A/V device 210 to wake from a passive state to begin recording video data. For example, in the process 900 and/or the process 1000, the second camera 314 of at least the second A/V device 210 may be awoken in the presence of the one or more predetermined conditions being met for the first A/V device 210, as compared to the at least the second A/V device 210 not being awoken in the absence of the one or more predetermined conditions. In the process 900, for example, in response to receiving, by the first communication module 312 of the first A/V device 210, the camera activation instruction from the network-connected device 110, the processor(s) 310 of the first A/V device 210 may cause the processor(s) 310 of the second A/V device 210 to wake the second camera 314 of the at least the second A/V device 210 to begin recording video data. In this example for the process 900, in the absence of receiving the camera activation instruction from the network-connected device 110, the processor(s) 310 of the first A/V device 210 may not cause the processor(s) 310 of the second A/V device 210 to wake the second camera 314 of the at least the second A/V device 210 to begin recording the video data. Also, in this example for the process 900, the one or more predetermined conditions may include the first communication module 312 of the first A/V device 210 receiving the camera activation instruction from the network-connected device 110.

In the process 1000, for example, in response to receiving, by the first communication module 312 of the first A/V device 210, the pre-identified wireless device identifier data from the wireless device 118, the processor(s) 310 of the first A/V device 210 may cause the processor(s) 310 of the second A/V device 210 to wake the second camera 314 of the at least the second A/V device 210 to begin recording video data. In this example for the process 1000, in the absence of receiving the pre-identified wireless device identifier data from the wireless device 118, the processor(s) 310 of the first A/V device 210 may not cause the processor(s) 310 of the second A/V device 210 to wake the second camera 314 of the at least the second A/V device 210 to begin recording the video data. Also, in this example for the process 1000, the one or more predetermined conditions may include the first communication module 312 of the first A/V device 210 receiving the pre-identified wireless device identifier data from the wireless device 118.

In other examples, the process 900 and/or the process 1000 may include causing the second camera 314 of the second A/V device 210 to record video data at a higher resolution in the presence of the one or more predetermined conditions, as compared to recording the video data at a lower resolution in the absence of the one or more predetermined conditions. For example, in the process 900 and/or the process 1000, the processor(s) 310 of the first A/V device 210 may cause the second camera 314 of at least the second A/V device 210 to record video data at the higher resolution in the presence of the one or more predetermined conditions being met for the first A/V device 210, as compared to the second camera 314 of at least the second A/V device 210 recording video data at the lower resolution in the absence of the one or more predetermined conditions. In the process 900, for example, in response to receiving, by the first communication module 312 of the first A/V device 210, the camera activation instruction from the network-connected device 110, the processor(s) 310 of the first A/V device 210 may cause the second camera 314 of the second A/V device 210 to record video data at the higher resolution. In this example for the process 900, in the absence of receiving the camera activation instruction from the network-connected device 110, the processor(s) 310 of the first A/V device 210 may not cause the second camera 314 of the second A/V device 210 to record video data at the higher resolution. Also, in this example for the process 900, the one or more predetermined conditions may include the first communication module 312 of the first A/V device 210 receiving the camera activation instruction from the network-connected device 110.

In the process 1000, for example, in response to receiving, by the first communication module 312 of the first A/V device 210, the pre-identified wireless device identifier data from the wireless device 118, the processor(s) 310 of the first A/V device 210 may cause the second camera 314 of the second A/V device 210 to record video data at the higher resolution. In this example for the process 1000, in the absence of receiving the pre-identified wireless device identifier data from the wireless device 118, the processor(s) 310 of the first A/V device 210 may not cause the second camera 314 of the second A/V device 210 to record video data at the higher resolution. Also, in this example for the process 1000, the one or more predetermined conditions may include the first communication module 312 of the first A/V device 210 receiving the pre-identified wireless device identifier data from the wireless device 118.

In some examples, the process 900 and/or the process 1000 may include causing the second communication module 312 of the second A/V device 210 to transmit the identifying information for the wireless device 118 to the network-connected device 110 using a first sequence in the presence of the one or more predetermined conditions, as compared to using a second sequence in the absence of the one or more predetermined conditions. For example, in the process 900 and/or the process 1000, the processor(s) 310 of the first A/V device 210 may cause the second communication module 312 of at least the second A/V device 210 to transmit, using the first sequence, the identifying information for the wireless device 118 to the network-connected device 110 in the presence of the one or more predetermined conditions being met for the first A/V device 210, as compared to the second communication module 312 of at least the second A/V device 210 transmitting the identifying information for the wireless device 118 to the network-connected device 110 using the second sequence. In the process 900, for example, in response to receiving, by the first communication module 312 of the first A/V device 210, the camera activation instruction from the network-connected device 110, the processor(s) 310 of the first A/V device 210 may cause the second communication module 312 of at least the second A/V device 210 to transmit the identifying information for the wireless device to the network-connected device 110 after transmitting the video data (e.g., using the first sequence). In this example for the process 900, in the absence of receiving the camera activation instruction from the network-connected device 110, the processor(s) 310 of the A/V device 210 may not cause the second communication module 312 to transmit the identifying information for the wireless device to the network-connected device 110 using the first sequence. In this case, in the absence of receiving, by the first communication module 312, the camera activation instruction from the network-connected device 110, the second communication module 312 may transmit the identifying information for the wireless device to the network-connected device 110 before or concurrently with transmitting the video data (e.g., using a second sequence). Also, in this example for the process 900, the one or more predetermined conditions may include the first communication module 312 of the first A/V device 210 receiving the camera activation instruction from the network-connected device 110.

In the process 1000, for example, in response to receiving, by the first communication module 312 of the first A/V device 210, the pre-identified wireless device identifier data from the wireless device 118, the processor(s) 310 of the first A/V device 210 may cause the second communication module 312 of at least the second A/V device 210 to transmit the identifying information for the wireless device 118 to the network-connected device 110 after transmitting the video data (e.g., using the first sequence). In this example for the process 1000, in the absence of receiving the pre-identified wireless device identifier data from the wireless device 118, the processor(s) 310 of the A/V device 210 may not cause the second communication module 312 to transmit the identifying information for the wireless device 118 to the network-connected device 110 using the first sequence. In this case, in the absence of receiving, by the first communication module 312, the pre-identified wireless device identifier data from the wireless device 118, the second communication module 312 may transmit the identifying information for the wireless device to the network-connected device 110 before or concurrently with transmitting the video data (e.g., using a second sequence). Also, in this example for the process 1000, the one or more predetermined conditions may include the first communication module 312 of the first A/V device 210 receiving the pre-identified wireless device identifier data from the wireless device 118.

In other examples, the process 900 and/or the process 1000 may include causing the second communication module 312 of the second A/V device 210 to transmit the video data to the network-connected device 110 using a greater bandwidth in the presence of the one or more predetermined conditions, as compared to using a lesser bandwidth in the absence of the one or more predetermined conditions. In the process 900, for example, in response to receiving, by the first communication module 312, the camera activation instruction from the network-connected device 110, the processor(s) 310 of the first A/V device 210 may cause the second communication module 312 to transmit the video data to the network-connected device 110 using the greater bandwidth. In this example for the process 900, in the absence of receiving the camera activation instruction from the network-connected device 110, the processor(s) 310 of the A/V device 210 may not cause the communication module 312 to transmit the video data to the network-connected device 110 using the greater bandwidth. In this case, in the absence of receiving, by the first communication module 312, the camera activation instruction from the network-connected device 110, the second communication module 312 may transmit the video data to the network-connected device 110 using the lesser bandwidth. Also, in this example for the process 900, the one or more predetermined conditions may include the first communication module 312 receiving the camera activation instruction from the network-connected device 110.

In the process 1000, for example, in response to receiving, by the first communication module 312, the pre-identified wireless device identifier data from the wireless device 118, the processor(s) 310 of the first A/V device 210 may cause the second communication module 312 to transmit the video data to the network-connected device 110 using the greater bandwidth. In this example for the process 1000, in the absence of receiving the pre-identified wireless device identifier data from the wireless device 118, the processor(s) 310 of the A/V device 210 may not cause the communication module 312 to transmit the video data to the network-connected device 110 using the greater bandwidth. In this case, in the absence of receiving, by the first communication module 312, the pre-identified wireless device identifier data from the wireless device 118, the second communication module 312 may transmit the video data to the network-connected device 110 using the lesser bandwidth. Also, in this example for the process 1000, the one or more predetermined conditions may include the first communication module 312 receiving the pre-identified wireless device identifier data from the wireless device 118 from the network-connected device 110.

Figure 11:
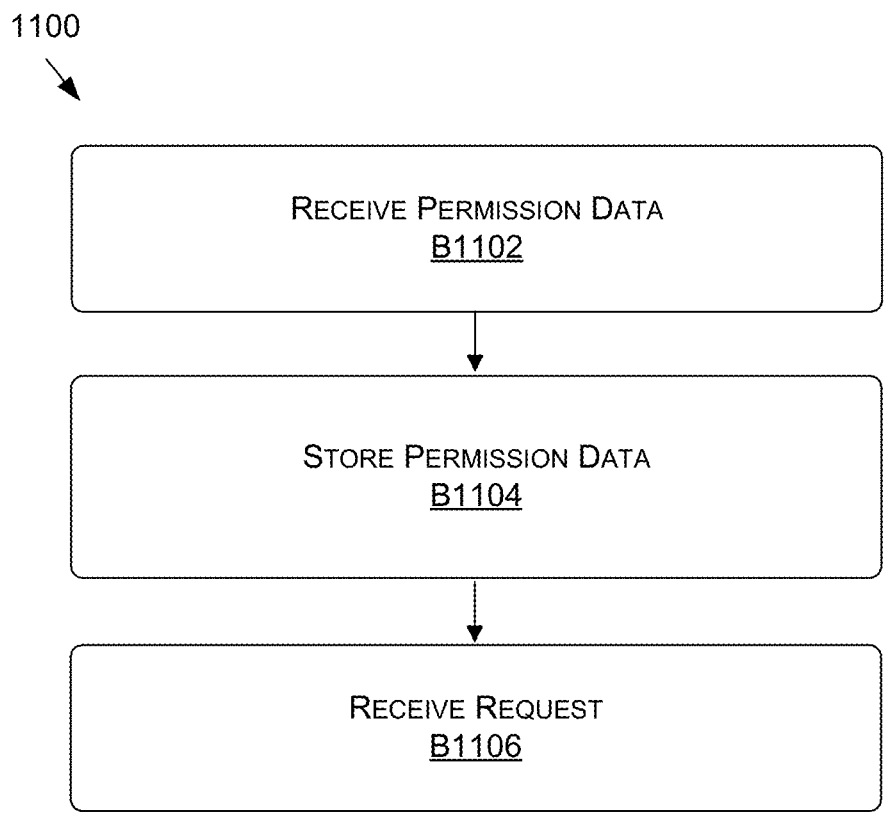
FIG. 11 is a flowchart illustrating another example aspect of the process shown in FIG. 9, according to various aspects of the present disclosure.

FIG. 11 is a flowchart illustrating an example aspect of the process 900 shown in FIG. 9, according to various aspects of the present disclosure. One or more blocks shown in FIG. 11 may be performed by the A/V device 210 in cases where user(s) associated with the A/V device 210 may provide permission for a third-party user and/or system to access and otherwise use data recorded and received by the A/V device 210. For example, the process 1100, at block B1102, receives permission data of the user of the A/V device 210. In some examples, the permission data is received by the communication module 312 of the A/V device 210. The permission data received at block B1102 includes one of: a presence of, and an absence of, permission to transmit the identifying information for the wireless device 118 to the network-connected device 110.

The process 1100, at block B1104, may store the permission data of the user of the A/V device 210 in the volatile memory 322 and/or the non-volatile memory 324 of the A/V device 210. The process 1100, at block B1106, may receive a request to transmit the identifying information for the wireless device 118 to the network-connected device 110. For example, the communication module 312 of the A/V device 210 receives the request to transmit the identifying information for the wireless device 118 to the network-connected device 110. In these embodiments, and referring again to FIG. 9, block B910 may include transmitting the identifying information for the wireless device 118 to the network-connected device 110 in response to the permission data (e.g., received and stored in blocks B1102 and B1104, respectively) including the presence of permission to transmit the identifying information to the network-connected device 110. For example, the communication module 312 of the A/V device 210 transmits the identifying information for the wireless device 118 to the network-connected device 110 in response to the permission data including the presence of permission to transmit the identifying information to the network-connected device 110.

Figure 12:
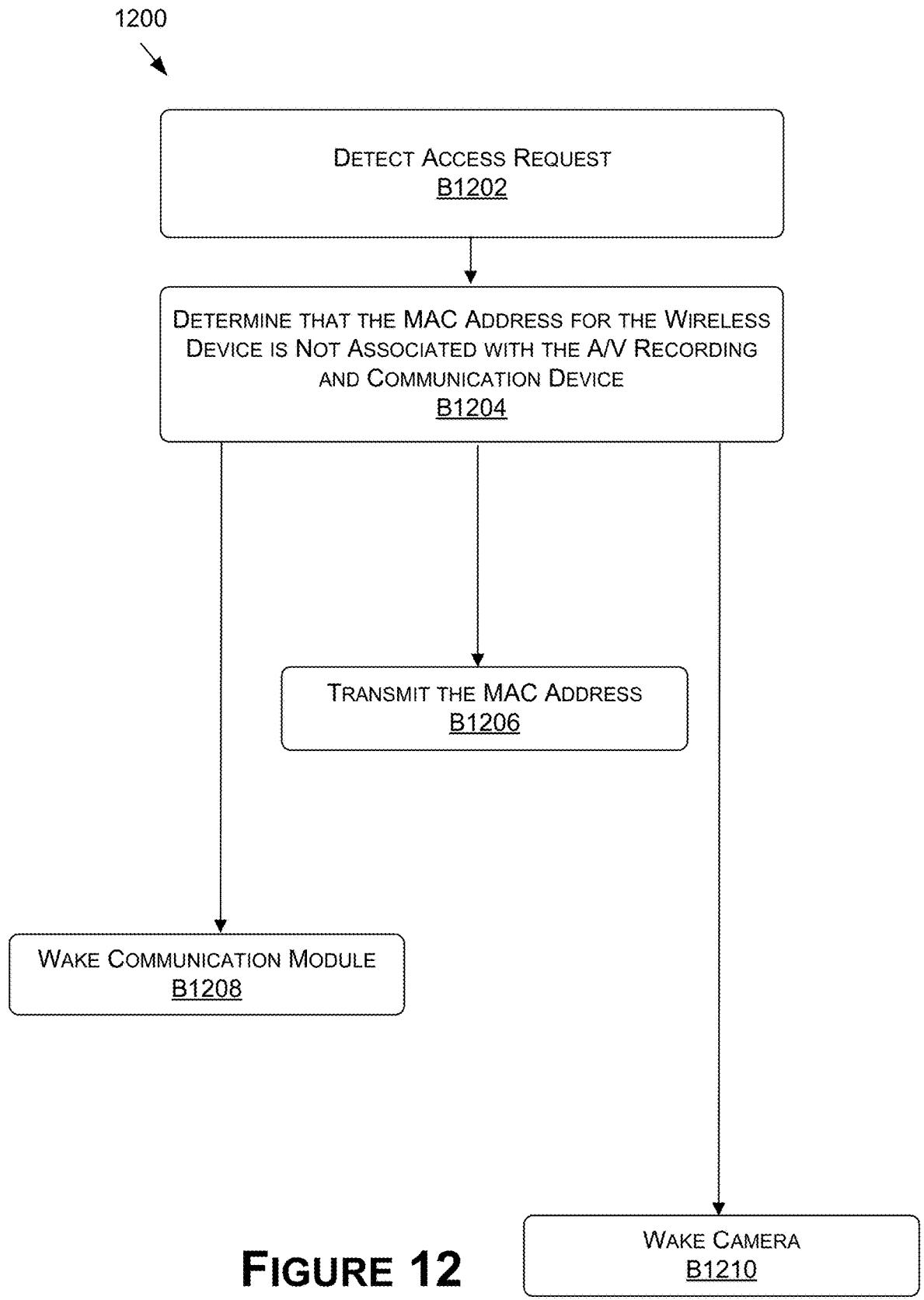
FIG. 12 is a flowchart illustrating another example aspect of the process shown in FIG. 9, according to various aspects of the present disclosure.

FIG. 12 is a flowchart illustrating an example aspect of the process 900 shown in FIG. 9, according to various aspects of the present disclosure. One or more blocks shown in FIG. 12 may be performed by the A/V device 210 in cases where the A/V device 210 and components associated with and communication with the A/V device 210 are configured to detect an access request by wireless device 118 to a wireless network associated with the A/V device 210 (e.g., at the A/V device 210 user's home). For example, the process 1200, at block B1202, detects an access request of the wireless device 118 to a WiFi network associated with the A/V recording and communication device (e.g., the A/V device 210). For example, where the antenna 332 of the communication module 312 of the A/V device 210 includes a WiFi antenna communicatively coupled with a router of the user's network 218, the communication module 312 and/or the processor(s) 310 of the A/V device 210 may detect the access request of the wireless device 118 to the WiFi network of the user's network 218. In these embodiments, the identifying information for the wireless device 118 may include the MAC address. Referring again to FIG. 9, detecting the access request in block B1202 may include receiving and determining the MAC address based on the signal received from the wireless device 118 in block B904.

In various embodiments, the A/V device 210 may detect a presence of the wireless device 118 in a variety of ways. For example, as described above, the access request to a WiFi network may be used to detect a presence of the wireless device 118. In addition, the access request may include identifying information as described herein (e.g., a MAC address). In various embodiments, the presence of the wireless device 118 may be detected based on passive and/or active signals sent from the wireless device 118. For purposes of this disclosure, an active signal may comprise a signal directly or indirectly prompted by a user, while a passive signal may comprise a signal sent from the wireless device 118 that is not prompted by the user. For example, an active signal from the wireless device 118 may include the access request to attempt to connect to the WiFi network. That access request may be considered an active signal when directly prompted by the user when the user specifically interacts with the wireless device 118 to select and request to connect to the WiFi network. That access request may also be considered an active signal when indirectly prompted by the user to request to connect to the WiFi network, such as when a user indicates that a WiFi network to which the wireless device 118 has connected in the past should be automatically connected to in the future. A passive signal, on the other hand, may include signals sent by the wireless device 118 that are detectable by the A/V device 210, but not directly or indirectly prompted by a user of the wireless device 118. For example, various types of wireless devices may send passive signals searching for available WiFi (or other types) of wireless networks, even without direct or indirect prompts from a user. Those passive signals may be detected by the A/V device 210, for example, to detect the presence of the wireless device 118. Those passive signals may also include identifying information as described herein. As such, identifying information of a wireless device present near the A/V device 210 may be determined without direct or indirect prompts from a user of a wireless device. Some wireless devices may even send out passive signals in spite of prompts from a user. For example, some smartphone devices may send out signals on WiFi network frequencies (e.g., scanning for WiFi networks) even if WiFi functionality is turned off on the smartphone. Such passive signals may be used by the A/V device 210 to detect a presence of a wireless device and determine identifying information for the wireless device.

As just one example of a passive signal that may be sent out by a wireless device and detected by the A/V device 210, wireless devices may send out probe requests to search for nearby access points to a wireless network (e.g., WiFi, Bluetooth, etc.). Such probe requests may include information unique to a wireless device, such as a MAC address. Accordingly, the probe requests may include identifying information about the device sending the probe request. In some embodiments, an access point (e.g., the A/V device 210, a WiFi router, etc.) may respond to a probe request with a probe response signal that includes information about the access point and/or the network. Because identifying information may be included in passive probe requests from wireless devices, the presence of specific wireless devices may be determined by the A/V device 210 as described herein, even if the user of the wireless device does not actively cause his or her wireless device to communicate with the A/V device 210. Accordingly, the various functionalities described herein that may be performed with identifying information of a wireless device may also be performed with respect to wireless devices that have sent out passive signals (e.g., probe requests) detected/received at the A/V device 210.

In various embodiments, other types of passive signals may be sent out from wireless devices that may be detected/received by the A/V device 210, and identifying information about wireless devices may be determined from those passive signals. For example, signals related to location services on a wireless device (e.g., Global Positioning System (GPS) signals, or other satellite-based radionavigation system signals) may be passively sent from a wireless device and detected by the A/V device 210. In another example, Bluetooth signals may be passively sent from a wireless device (e.g., signal scanning for a Bluetooth connectable device). In another example, passive signals from a wireless device may be sent out using any other type of wireless protocol or technology, such as near field communications (NFC) protocols (e.g., for payment communication and processing technologies, traffic/toll control and payment devices, etc.); short message service (SMS) communications, multimedia messaging service (MMS), WiFi messaging, other WiFi communications (e.g., voice over internet protocol (VoIP), video chat communications, etc.), or other messaging communications; cellular communications including call or text communications; or other radio frequency (RF) channels, infrared communications channels, etc. In various embodiments, passive signals detected from a wireless device may be prompted by another device, such as the A/V device 210. For example, with NFC communications, the A/V device 210 may broadcast a signal that prompts NFC functionality of a wireless device to respond with a signal that may include identifying information. In various embodiments, a wireless device may passively emit an electro-magnetic field (EMF). The EMF may be related or unrelated to operation of the wireless device. For example, any wireless device that holds an electrical charge (e.g., in a battery) may emit EMF, regardless of the state of the wireless device (e.g., on, off, active, idle, locked, etc.). EMFs emitted by wireless devices may also be unique, such that identifying information based on the EMF may be determined by the A/V device 210. In some embodiments, EMFs emitted by wireless devices may also indicate information about the wireless device and/or its battery (e.g., device or battery type, device or battery size, device or battery voltage/current ratings, etc.). That information about the wireless device and/or its battery may also be used as identifying information, alone or in combination with other information determined about the wireless device.

The various types of signals described herein that may be passively sent or sent as a result of indirect prompts from a user from a wireless device such as the wireless device 118 may be sent when the wireless device 118 is in various states. For example, the wireless device 118 may send signals when the wireless device 118 is active (e.g., its screen is on); idle (e.g., its screen is off); locked (e.g., its lock screen is shown); at a home screen; while an app is in use; while apps are running in the background; whether or not WiFi, Bluetooth, NFC, location services, or other functionalities or communications protocols are activated; whether or not a wireless device is in airplane mode or other modes preset by an operating system (OS) developer; or other states of a wireless device.

In various embodiments, signals from a wireless device may include identifying information other than or in addition to a MAC address. For example, signals from a wireless device may include unique or non-unique information that may be used to identify a device. If the information is not unique, that information may be used in combination with other information to identify a device. For example, signals in a certain format or with certain characteristics may be used to determine information about a device, such as a device type, a user of the device, a browser or version of browser being used, an operating system or version of an operating system being used, an app being used or version of app being used, etc. Other identifying information (or information that may be used in combination with other information as identifying information) that may be part of a signal from a wireless device may include configuration information for a communications channel, an internet protocol (IP) address, etc.

The process 1200, at block B1204, may determine that the MAC address or other identifying information for the wireless device 118 is not associated with the A/V device 210. As described herein, the identifying information may be determined from active or passive signals from the wireless device 118. For example, the processor(s) 310 of the A/V device 210 may determine that the MAC address for the wireless device 118 is not associated with a listing of known and/or allowed devices permitted to access the WiFi network of the user's network 218, such as the activity of interest database 522 shown in FIG. 5. In that case, the processor(s) 310 of the A/V device 210 may facilitate denying the WiFi access request by the wireless device 118. Alternatively, where, at block B1204, the process 1200 determines that the MAC address for the wireless device 118 is associated with the A/V device 210, the processor(s) 310 of the A/V device 210 may facilitate granting the WiFi access request by the wireless device 118.

The process 1200, at block B1206, transmits the MAC address to the network-connected device 110 in response to determining, at block B1204, that the MAC address for the wireless device 118 is not associated with the listing of known MAC addresses for the WiFi network. For example, the communication module 312 of the A/V device 210 may transmit the MAC address to the network-connected device 110 in response to determining, at block B1204, that the MAC address for the wireless device 118 is not associated with the listing of known MAC addresses for the WiFi network. Alternatively, where, at block B1204, the process 1200 determines that the MAC address for the wireless device 118 is associated with the A/V device 210, block B1206 may not be performed in the process 1200.

The process 1200, at block B1208, wakes the communication module 312 of the A/V device 210 from a passive state to begin receiving the signal from the wireless device 118. For example, the processor(s) 310 of the A/V device 210 may wake the communication module 312 of the A/V device 210 from the passive state in response to determining, at block B1204, that the MAC address for the wireless device 118 is not associated with the listing of known MAC addresses for the WiFi network. Alternatively, where, at block B1204, the process 1200 determines that the MAC address for the wireless device 118 is associated with the A/V device 210, block B1208 may not be performed in the process 1200.

The process 1200, at block B1210, wakes the camera 314 of the A/V device 210 from the passive state to begin recording the video data. For example, the processor(s) 310 of the A/V device 210 may wake the camera 314 of the A/V device 210 from the passive state in response to determining, at block B1204, that the MAC address for the wireless device 118 is not associated with the listing of known MAC addresses for the WiFi network. Alternatively, where, at block B1204, the process 1200 determines that the MAC address for the wireless device 118 is associated with the A/V device 210, block B1210 may not be performed in process the 1200.

In various embodiments, when it is determined, at block B1204, that the MAC address (or any other kind or type of identifier including identifying information determined from passive or active signals from the wireless device 118) for the wireless device 118 is not associated with the A/V device 210, the process 1200 may include transmitting a notification to the client device(s) 214, 216. The notification may comprise, for example, a push notification, and may indicate that an unrecognized and/or unauthorized wireless device was detected. For example, since an unrecognized wireless device may be associated with an intruder (e.g., a burglar), the notification to the client device(s) 214, 216 may include warning language, such as "Intruder Wi-Fi packet detected." The notification may be sent prior to, or together with, image data (e.g., video) of the possible intruder. The foregoing aspects may be performed in addition to, or as an alternative to, blocks B1206, B1208, and B1210 of the process 1200. In various embodiments, notifications to the client device(s) 214, 216 may be suppressed when the MAC address (or any other kind or type of identifier including identifying information determined from passive or active signals from the wireless device 118) for the wireless device 118 is associated with the A/V device 210. That is, a notification to the client device(s) 214, 216 may only be sent when it is determined, at block B1204, that the MAC address (or any other kind or type of identifier including identifying information determined from passive or active signals from the wireless device 118) for the wireless device 118 is not associated with the A/V device 210. In this manner, unwanted notifications may be reduced, as it may be more likely that a user of the client device(s) 214, 216 may not want to receive a notification when a known person (e.g., a cohabitant, resident, family member, friend, etc.) is detected by the A/V device 210.

Figure 13:
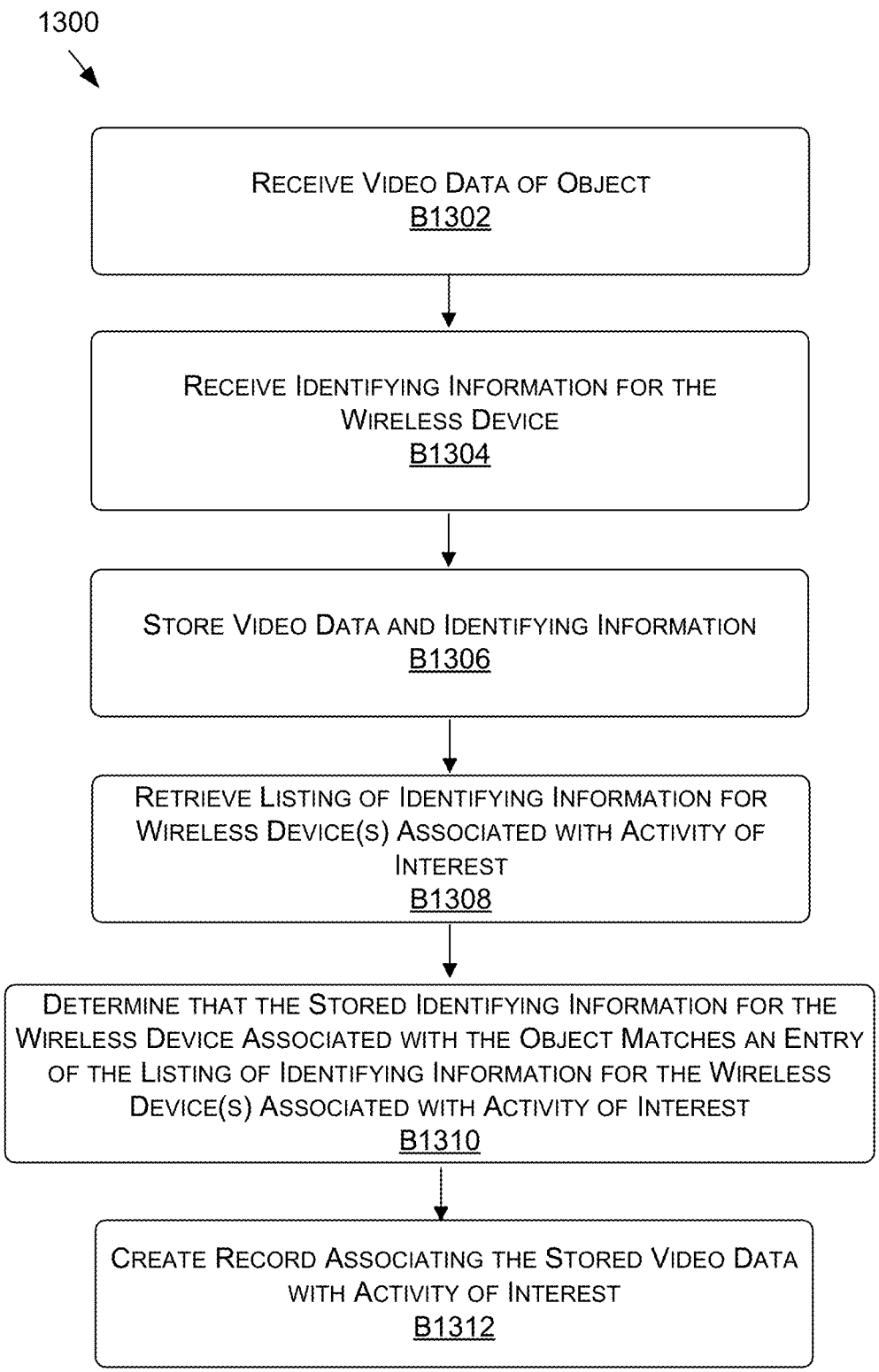
FIG. 13 is a flowchart illustrating another example process for identifying a wireless device based on data collected by an A/V recording and communication device, according to various aspects of the present disclosure.

FIG. 13 is a flowchart illustrating an example process 1300 for identifying a wireless device based on data collected by an A/V recording and communication device, according to various aspects of the present disclosure. The process 1300, at block B1302, receives video data of the object 106 in the FOV 104 of the camera 314. For example, a computing device (e.g., the processor 502 of the server 224) may receive, from the communication module 312 of the A/V device 210, video data of a person 114 within the FOV of the camera 314. In the process 1300, at block B1302, receiving the video data of the object 106 may include receiving the video data at the processor 502 of the server 224 via the communication module 504 of the server 224. In some examples, the object 106 may have the wireless device 118 associated with it, and the wireless device 118 may be proximate the object 106. For example, the person 114 may be carrying the wireless device 118 during such time when he or she is in the FOV of the camera 314 and/or the FOV of the motion sensor(s) 326.

The process 1300, at block B1304, receives the identifying information for the wireless device 118 (including, e.g., identifying information determined from passive or active signals). For example, the processor 502 of the server 224 may receive, from the communication module 312 of the A/V device 210, the identifying information for the wireless device 118. In the process 1300, at block B1304, receiving the identifying information for the wireless device 118 may include receiving the identifying information for the wireless device 118 at the processor 502 of the server 224 via the communication module 504 of the server 224.

The process 1300, at block B1306, stores the video data of the object 106 and the identifying information for the wireless device 118 (including, e.g., identifying information determined from passive or active signals). For example, the processor 502 of the server 224 may store the video data of the object 106 and the identifying information for the wireless device 118 in the memory 506 of the server 224. In some examples, the process 1300, at block B1306, may include storing the video data of the object 106 and the identifying information for the wireless device 118 in response to receiving, at blocks B1302 and B1304, the video data and the identifying information. In other examples, in the process 1300, at block 1306, storing the video data of the object 106 and the identifying information for the wireless device 118 may include storing the video data and the identifying information for the wireless device in the network-connected device 110. For example, the processor 502 of the server 224 may store the video data of the object 106 and the identifying information for the wireless device 118 in the memory 506 of the server 224.

The process 1300, at block B1308, retrieves, from a database, a listing of identifying information (including, e.g., identifying information determined from passive or active signals) for one or more wireless devices 118 associated with activity of interest (e.g., criminal activity). For example, the processor 502 of the server 224 may retrieve the listing of identifying information for the one or more wireless devices 118 associated with activity of interest from a database stored in the memory 506 of the server 224. In some examples, the server 224 may receive data including the listing of identifying information for the one or more wireless devices 118 associated with activity of interest from a database stored in memory located and/or maintained outside the confines of the server 224 (e.g., an external database). In these embodiments, in the process 1300, at block B1308, retrieving the listing of identifying information for the one or more wireless devices 118 associated with activity of interest may include receiving, on an as-needed basis and/or at predetermined intervals of time, update data containing an updated listing of identifying information (including, e.g., identifying information determined from passive or active signals) for the one or more wireless devices 118 associated with activity of interest. In other examples, in the process 1300, at block 1308, retrieving the listing of identifying information for the one or more wireless devices 118 associated with activity of interest may include retrieving, by the processor 502 of the server 224, the listing of identifying information for the one or more wireless devices 118 associated with activity of interest from the database, such as the activity of interest database 522 of FIG. 5.

The process 1300, at block B1310, determines that the stored identifying information for the wireless device 118 (including, e.g., identifying information determined from passive or active signals) associated with the object 106 in the FOV of the camera 314 matches an entry of the listing of identifying information for the one or more wireless devices 118 associated with activity of interest. For example, in the process 1300, at block B1310, the processor 502 of the server 224 may read, from the memory 506, the stored identifying information for the wireless device 118 received at block B1304 and compare it to the listing of identifying information for the one or more wireless devices 118 associated with activity of interest.

The process 1300, at block B1312, creates a record associating the stored video data with activity of interest. For example, the processor 502 of the server 224 may store the video data of the object 106 in association with the identifying information for the wireless device 118 (including, e.g., identifying information determined from passive or active signals) received at block B1304 (e.g., in a single file folder and/or as a specified class of data in the memory 506). In some examples, in the process 1300, at block B1312, creating the record associating the stored video data with activity of interest (e.g., criminal activity) includes storing, in the memory 506, video data of interest 518 and identifying information of interest 520 in an activity of interest database 522 (FIG. 5). In other examples, the process 1300, at block B1312, may include creating the record associating the stored video data with activity of interest in response to determining that the stored identifying information for the wireless device 118 associated with the object 106 in the FOV of the camera 312 matches the entry of the listing of identifying information for one or more wireless devices 118 associated with activity of interest. In some examples, in the process 1300, at block B1312, creating the record associating the stored video data with activity of interest includes creating, by the network-connected device 110 (e.g., the server 224), the record associating the stored video data with activity of interest.

In various embodiments, an activity of interest database (e.g., the activity of interest database 522 of FIG. 5) may be a database of persons, devices, etc. known to be associated with activity of interest (e.g., criminal activity). For example, a law enforcement or other government or security organization may maintain a database of identifying information for devices associated with persons, vehicles, etc. In this way, an A/V device (e.g., the A/V device 210) may detect the presence of a wireless device that is in the database, even if the A/V device has never detected a presence of that wireless device before. For example, activity of interest databases may be similar to or one of a person of interest database, a background checking database, a graffiti tracking database, or other type of database. Examples of such databases may include the California Department of Justice CALGang database, the Chicago Police Department Citizen and Law Enforcement Analysis and Reporting (CLEAR) Data Warehouse, and the Automated Regional Justice Information System (ARES) Graffiti Tracker.

For example, one or more law enforcement agencies may add identifying information relating to wireless devices of interest (or associated with vehicles and/or persons considered of interest), such that once an A/V device detects that a wireless device is nearby, identifying information (including, e.g., identifying information determined from passive or active signals) for that device may be checked against the database for whether a wireless device is considered of interest (or associated with a vehicle and/or person considered of interest). In this way, an activity of interest database as described herein may be used, even if it is created and/or maintained by a third party, and may be used to identify wireless devices of interest, even if the A/V device has never interacted with or detected that wireless device before. If a wireless device from a database is detected by an A/V device, the system may also send a notification to the party that maintains the database or added the information about the wireless device to the database. For example, if a law enforcement agency adds identifying information about a wireless device of a dangerous person (e.g., someone who has recently committed a violent crime, an active shooter, etc.) to a database, a message may be sent to various A/V devices to monitor for a wireless device associated with the dangerous person. If the wireless device associated with the dangerous person is detected based on the information in the database, a message may be generated by the A/V device to send to a device of the entity that added the identifying information to the database. To facilitate such messaging, the database may further include contact information for a party that has added something to the database, such that a message relating to that information may be easily generated when a wireless device is identified. In some embodiments, the A/V device may send or stream video to a device of the entity that added the identifying information to the database.

In other examples, the process 1300 may include storing location data for the camera 312. For example, the processor 506 may receive, via the communication module 504 of the server 224, location data for the camera 312 from a user of the A/V device 210 at the time of and/or after installation of the A/V device 210 by the user. In some examples, the processor 506 may store the location data for the camera 312 of the A/V device 210 in the memory 506 of the server 224. In some examples, the memory 506 is coupled in communication with the processor 502 of the server 224.

In some examples, block B1306 of the process 1300 may include storing the video data in the memory 506, and then storing the identifying information for the wireless device 118 (including, e.g., identifying information determined from passive or active signals) in the memory 506 after storing the video data in the memory 506. In other examples, block B1306 of the process 1300 may include storing the identifying information for the wireless device 118 in the memory 506, and then storing the video data in the memory 506 after storing the identifying information for the wireless device in the memory 506. In some examples, block B1306 of the process 1300 may include storing the identifying information for the wireless device 118 in the memory 506 substantially simultaneously with storing the video data in the memory 506 of the server 224.

In other examples, the identifying information received, at block B1304, is encoded, and the process 1300 may include decoding the received identifying information for the wireless device 118 (including, e.g., identifying information determined from passive or active signals). For example, the processor 502 of the server 224 may decode the received identifying information for the wireless device 118. In these embodiments, after decoding the received identifying information for the wireless device 118, the process 1300 may include storing the decoded identifying information for the wireless device 118 in the memory 506 of the server 224. In some examples, the process 1300 may include determining, by the processor 502, a direction of movement of the object 106 based, at least in part, on the video data. In other examples, the process 1300 may include determining, by the processor 502, a speed of movement of the object 106 based, at least in part, on the video data.

In some examples, in the process 1300, the object 106 is or includes a person 114. Where the object 106 is a person 114, the person 114 may be a criminal suspect or a crime victim. In some examples, the object 106 includes a pet. In other examples, the object 106 includes a vehicle 116. In other examples, where the object 106 includes a vehicle 116, the vehicle 116 may include the criminal suspect and/or the crime victim as a driver and/or passenger of the vehicle 116.

Figure 14:
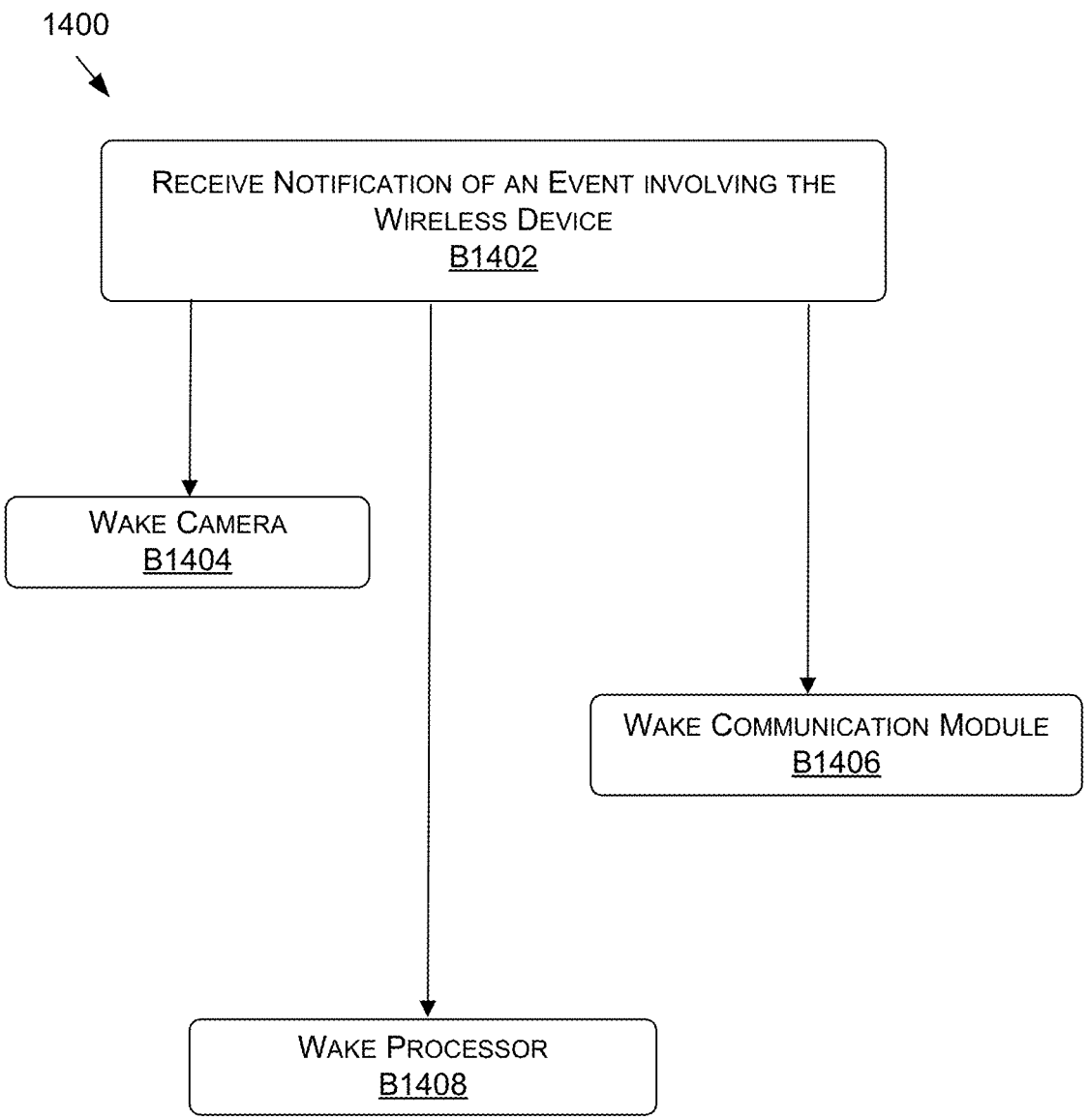
FIG. 14 is a flowchart illustrating an example aspect of the process shown in FIG. 13, according to various aspects of the present disclosure.

FIG. 14 is a flowchart illustrating an example aspect of the process 1300 shown in FIG. 13, according to various aspects of the present disclosure. One or more of blocks shown in FIG. 14 may be performed by the network-connected device 110 upon the occurrence of an event such as a criminal suspect or the suspect's wireless device 118 being identified in the geographic area of the A/V device 210 (e.g., by one or more neighboring A/V device(s) 210). For example, a process 1400, at block B1402, receives a notification of an event involving the wireless device 118. In some examples, the notification of the event involving the wireless device 118 is received by the processor 502 of the server 224, including via the communication module 504. For example, the processor 502 may receive the notification of the event involving the object 106 and the wireless device 118 associated with the object 106. In some examples, where the object 106 is the person 114 who is the criminal suspect, the event may include a commission of a crime and the notification of the event may include a report of the crime and/or the report thereof having occurred.

The process 1400, at block B1404, wakes the camera 314 of the A/V device 210 in response to receiving the notification of the event involving the wireless device 118. For example, in response to receiving, by the communication module 504, the notification of the event involving the wireless device 118, the processor 502 of the server 224 wakes the camera 314 from a passive state to begin recording the video data (e.g., by transmitting a wake camera instruction to the A/V device 210).

The process 1400, at block B1406, wakes the communication module 312 of the A/V device 210 in response to receiving the notification of the event involving the wireless device 118. For example, in response to receiving, by the processor 502 via the communication module 504, the notification of the event involving the wireless device 118, the processor 502 wakes the communication module 312 of the A/V device 210 from a passive state to begin receiving the signal from the wireless device 118 (e.g., by transmitting a wake communication module instruction to the A/V device 210).

The process 1400, at block B1408, wakes the processor 502 of the server 224 in response to receiving, by the communication module 504, the notification of the event involving the wireless device 118. For example, in response to receiving, by the communication module 504, the notification of the event involving the wireless device 118, the process 1400 wakes the processor 502 from a passive state to begin receiving, from the communication module 312 of the A/V device 210, the identifying information for the wireless device 118.

In some examples, the notification of the event involving the wireless device 118 may include a location associated with the occurrence of the event. In these embodiments, the process 1400 may include determining, by the processor 502 of the server 224, whether a location of one or more A/V devices 210 are within the predetermined distance of the location associated with the occurrence of the event (e.g., in order to wake one or more of those A/V devices 210). Also, in these embodiments, block B1306 of the process 1300 may include storing the video data and the identifying information in the memory 506 of the server 224 in response to determining that the location of the A/V device 210 is within the predetermined distance of the location associated with the occurrence of the event.

In some examples, the notification of the event involving the wireless device 118 may include pre-identified wireless device identifier data associated with the occurrence of the event. For example, a criminal suspect may be known to be carrying a wireless device 118 having one or more known wireless signal characteristics. Where such wireless signal characteristics may function as pre-identified wireless device identifier data, providing it to the processor 502 of the server 224 may facilitate identifying and locating the wireless device 118 and the object 106 of interest associated therewith using the disclosed systems and methods.

In some examples, the process 1300 and/or the process 1400 may include causing a camera 314 to record video data at a higher resolution in the presence of one or more predetermined conditions, as compared to a lower resolution recorded in the absence of the one or more predetermined conditions. In the process 1300 and/or the process 1400, for example, in response to receiving, by the communication module 504, the identifying information for the wireless device 118 including the pre-identified wireless device identifier data, the processor 502 of the server 224 may cause the camera 314 to record video data at the higher resolution than the lower resolution used in the absence of receiving the identifying information for the wireless device 118 including the pre-identified wireless device identifier data. In this example for the process 1300 and/or the process 1400, the one or more predetermined conditions may include the communication module 504 receiving the identifying information for the wireless device 118 including the pre-identified wireless device identifier data.

In other examples, the process 1300 and/or the process 1400 may include causing the processor 502 of the server 224 to receive, via the communication module 504, the video data from the A/V device 210 using a greater bandwidth in the presence of the one or more predetermined conditions, as compared to using a lesser bandwidth in the absence of the one or more predetermined conditions. In the process 1300 and/or the process 1400, for example, in response to receiving, by the communication module 504, the pre-identified wireless device identifier data from the wireless device 118, the processor 502 of the server 224 may cause the communication module 504 of the server 224 to receive the video data from the A/V device 210 using the greater bandwidth. In this example for the process 1300 and/or the process 1400, in the absence of receiving the identifying information for the wireless device 118 including the pre-identified wireless device identifier data, the processor 502 of the server 224 may cause the communication module 504 to receive the video data from A/V device 210 using the lesser bandwidth. Also, in this example for the process 1300 and/or the process 1400, the one or more predetermined conditions may include the communication module 504 receiving the wireless device 118 identifying data including the pre-identified wireless device identifier data.

In some examples, the process 1300 and/or the process 1400 may include causing security system 120 associated with the A/V device 210 to arm in the presence of the one or more predetermined conditions, as compared to maintaining security system 120 in a disarmed and/or other functional state different from an armed state in the absence of the one or more predetermined conditions. In the process 1300 and/or the process 1400, for example, in response to receiving, by the communication module 504, the pre-identified wireless device identifier data from the wireless device 118, the processor 502 of the server 224 may cause the security system 120 associated with the A/V device 210 to arm. In this example for the process 1300 and/or the process 1400, in the absence of receiving the pre-identified wireless device identifier data from the wireless device 118, the processor 502 of the server 224 may cause the security system 120 associated with the A/V device 210 to be maintained in a disarmed and/or other functional state different from an armed state. Also, in this example for the process 1300 and/or the process 1400, the one or more predetermined conditions may include the processor 502 receiving, via the communication module 504, the pre-identified wireless device identifier data from the wireless device 118 from A/V device 210.

In other examples, the process 1300 and/or the process 1400 may include causing the processor 502, via the communication module 504, to transmit an alert to the client device(s) 214, 216 associated with the A/V device 210 in the presence of the one or more predetermined conditions, as compared to the alert not being transmitted to the client device(s) 214, 216 in the absence of the one or more predetermined conditions. In the process 1300 and/or the process 1400, for example, in response to receiving, by the processor 502 and/or the communication module 504, the pre-identified wireless device identifier data from the wireless device 118, the processor 502 may cause the communication module 504 to transmit, to the client device(s) 214, 216, the alert indicating the receipt of the pre-identified wireless device identifier data from the wireless device 118. In this example for the process 1300 and/or the process 1400, in the absence of receiving the pre-identified wireless device identifier data from the wireless device 118, the processor 502 of the server 224 may not cause the communication module 504 to transmit the alert to the client device(s) 214, 216. Also, in this example for the process 1300 and/or the process 1400, the one or more predetermined conditions may include the processor 502 receiving, via the communication module 504, the pre-identified wireless device identifier data from the wireless device 118. In these examples for the process 1300 and the process 1400, transmitting the alert to the client device(s) 214, 216 associated with the A/V device 210 may provide a user and/or other people associated with and authorized by the user to exercise additional caution and heightened security practices around such times when a criminal suspect or other person of interest is detected as being in close proximity to a user's home having A/V device 210. Also, in these examples, the alert may provide the user and/or the other people associated with and authorized by the user an ability to obtain information about the person of interest and to maintain a heightened awareness of their surroundings, including to identify the person(s) and to report on and/or warn others of the whereabouts of the person(s) of interest.

In some examples, the process 1300 and/or the process 1400 may include causing the processor 502 of the server 224 to transmit, via the communication module 504, an alert to a system 122 configured to monitor for emergency events in the presence of the one or more predetermined conditions, as compared to the alert not being transmitted to the system 122 configured to monitor for emergency events in the absence of the one or more predetermined conditions. In the process 1300 and/or the process 1400, for example, in response to receiving, by the processor 502 and/or the communication module 504, the pre-identified wireless device identifier data from the wireless device 118, the processor 502 of the server 224 may cause the communication module 504 to transmit, to the system 122 configured to monitor for emergency events, the alert indicating the receipt of the pre-identified wireless device identifier data from the wireless device 118. In this example for the process 1300 and/or the process 1400, in the absence of receiving the pre-identified wireless device identifier data from the wireless device 118, the processor 502 of the A/V device 210 may not cause the processor 502 to transmit, via the communication module 504, the alert to the system 122 configured to monitor for emergency events. Also, in this example for the process 1300 and/or the process 1400, the one or more predetermined conditions may include the processor 502 and/or the communication module 504 receiving the pre-identified wireless device identifier data from the wireless device 118. In these examples for the process 1300 and the process 1400, transmitting the alert to the system 122 configured to monitor for emergency events may provide a police agency and/or other interested parties additional tools and functionality to facilitate locating and/or apprehending a person of interest, such as a criminal suspect. Also, in these examples, the alert may provide the police agency and/or other interested parties an ability to obtain information about the person of interest and to maintain a heightened awareness of their surroundings, including to identify the person and to report on and/or warn others of the whereabouts of the person(s) of interest.

In other examples, the process 1300 and/or the process 1400 may be implemented for a plurality of A/V devices 210, including a first A/V device 210 at a first location and having a first communication module 312, and including a second A/V device 210 at a second location and having a second communication module 312. In these implementations, the first A/V device 210 has a first camera 314, and the second A/V device 210 has a second camera 314. The second A/V device 210 may be located within a predetermined distance of the first A/V device 210. The process 1300 and/or the process 1400 may include causing the second communication module 312 of at least the second A/V device 210 to wake from a passive state to begin transmitting the identifying information for the wireless device 118. For example, in the process 1300 and/or the process 1400, the second communication module 312 of at least the second A/V device 210 may be awoken in the presence of the one or more predetermined conditions being met for the first A/V device 210, as compared to the at least the second A/V device 210 not being awoken in the absence of the one or more predetermined conditions. The one or more predetermined conditions may include the second A/V device 210 being located within the predetermined distance of the first A/V device 210. In the process 1300 and/or the process 1400, for example, in response to receiving, by the communication module 504 of the server 224, the pre-identified wireless device identifier data from the wireless device 118 from the first A/V device 210, the processor 502 of the server 224 may cause the processor(s) 310 of the second A/V device 210 to wake the second communication module 504 of the at least the second A/V device 210 to begin receiving the signal including the identifying information from the wireless device 118. In this example for the process 1300 and the process 1400, in the absence of receiving the pre-identified wireless device identifier data from the wireless device 118 from the first A/V device 210, the processor 502 of the server 504 may not cause the processor(s) 310 of the second A/V device 210 to wake the second communication module 504 of the at least the second A/V device 210 to begin receiving the signal including the identifying information from the wireless device 118. Also, in this example for the process 1300 and the process 1400, the one or more predetermined conditions may include the first communication module 504 of the server 224 receiving the pre-identified wireless device identifier data from the wireless device 118 from the first A/V device 210.

In some examples, the process 1300 and/or the process 1400 include causing the first and second communication modules 312 of the first and at least the second A/V devices 210 to transmit locations of their respective cameras 314 to the server 224 to facilitate locating the object 106 of interest. For example, in the process 1300 and/or the process 1400, the first and second communication modules 312 may transmit the locations of their respective cameras 314 to the server 224 in the presence of the one or more predetermined conditions being met for the processor 502 of the server 224, as compared to the first and second communication modules 312 not transmitting their locations in the absence of the one or more predetermined conditions. In the process 1300 and/or the process 1400, for example, in response to receiving, by the processor 502 and via the communication module 504, the identifying information for the wireless device 118 including the pre-identified wireless device identifying data from the first A/V device 210, the processor 502 may cause the first and second communication modules 312 of the first and second A/V devices 210 to transmit their respective locations to the processor 502 of the server 224. In this example for the process 1300 and/or the process 1400, in the absence of receiving the pre-identified wireless device identifying data for the wireless device 118, the processor 502 of the server 224 may not cause the first and second communication modules 312 of the first and second A/V devices 210 to transmit their respective locations to the processor 502 of the server 224. Also, in this example for the process 1300 and/or the process 1400, the one or more predetermined conditions may include the processor 502 of the server 224 receiving, via the communication module 504, the pre-identified wireless device identifying data for the wireless device 118 from the first A/V device 210. These examples for the process 1300 and the process 1400 are applicable in cases where the current location of the first and/or the second A/V devices 210 is not already known (e.g., stored in the memory 506 of the server 224). In such cases, transmitting the locations of the first and second A/V devices 210 to the server 224 may provide the police agency and/or the other interested parties data for purposes of geographically locating the object 106 or person 114 of interest.

In some examples, the process 1300 and/or the process 1400 may include causing the second camera 314 of the second A/V device 210 to wake from a passive state to begin recording video data. For example, in the process 1300 and/or the process 1400, the second camera 314 of at least the second A/V device 210 may be awoken in the presence of the one or more predetermined conditions being met for the processor 502 of the server 224, as compared to the at least the second A/V device 210 not being awoken in the absence of the one or more predetermined conditions. In the process 1300 and/or the process 1400, for example, in response to receiving, by the processor 502 via the communication module 504, the identifying information for the wireless device 118 including the pre-identified wireless device identifying data from the first A/V device 210, the processor 502 may cause the second cameras 314 of the at least the second A/V device 210 to wake to begin recording the video data. In this example for the process 1300 and/or the process 1400, in the absence of receiving the identifying information for the wireless device 118 including the pre-identified wireless device identifying data from the first A/V device 210, the processor 502 may not cause the second camera 314 of the at least the second A/V device 210 to wake from the passive state to begin recording the video data. Also, in this example for the process 1300 and/or the process 1400, the one or more predetermined conditions may include the processor 502 of the server 224 receiving, via the communication module 504, the pre-identified wireless device identifying data for the wireless device 118 from the first A/V device 210.

In other examples, the process 1300 and/or the process 1400 may include causing the second camera 314 of the second A/V device 210 to record video data at a higher resolution in the presence of the one or more predetermined conditions, as compared to recording the video data at a lower resolution in the absence of the one or more predetermined conditions. For example, in the process 1300 and/or the process 1400, the processor 502 of the server 224 may cause the second camera 314 of at least the second A/V device 210 to record video data at the higher resolution in the presence of the one or more predetermined conditions being met for the processor 502, as compared to the second camera 314 of at least the second A/V device 210 recording video data at the lower resolution in the absence of the one or more predetermined conditions. In the process 1300 and/or the process 1400, for example, in response to receiving, by the processor 502 via the communication module 504, the identifying information for the wireless device 118 including the pre-identified wireless device identifying data from the first A/V device 210, the processor 502 may cause the second camera 314 of the second A/V device 210 to record video data at the higher resolution. In this example for the process 1300 and/or the process 1400, in the absence of receiving the identifying information for the wireless device 118 including the pre-identified wireless device identifying data from the first A/V device 210, the processor 502 may not cause the second camera 314 of the second A/V device 210 to record video data at the higher resolution. Also, in this example for the process 1300 and/or the process 1400, the one or more predetermined conditions may include the processor 502 of the server 224 receiving, via the communication module 504, the pre-identified wireless device identifying data for the wireless device 118 from the first A/V device 210.

In some examples, the process 1300 and/or the process 1400 may include causing the processor 502 to receive, via the communication module 504, the identifying information for the wireless device 118 using a first sequence in the presence of the one or more predetermined conditions, as compared to using a second sequence in the absence of the one or more predetermined conditions. For example, the process 1300 and/or the process 1400 may include causing the processor 502 of the server 224 to receive, via the communication module 504, the identifying information for the wireless device 118 from at least the second A/V device 210 using the first sequence in the presence of the one or more predetermined conditions being met for the processor 502, as compared to the processor 502 receiving the identifying information for the wireless device 118 from at least the second A/V device 210 using the second sequence. In the process 1300 and/or the process 1400, for example, in response to receiving, by the processor 502 and via the communication module 504, the identifying information for the wireless device 118 including the pre-identified wireless device identifying data from the first A/V device 210, the processor 502 may cause the communication module 504 to receive the identifying information for the wireless device to the network-connected device 110 after receiving the video data (e.g., using the first sequence). In this example for the process 1300 and/or the process 1400, in the absence of receiving the identifying information for the wireless device 118 including the pre-identified wireless device identifying data from the first A/V device 210, the processor 502 may not cause the communication module 504 to receive the identifying information for the wireless device from the second A/V device 210 using the first sequence. In this case, in the absence of receiving, by the communication module 504, the identifying information for the wireless device 118 including the pre-identified wireless device identifying data from the first A/V device 210, the communication module 504 may receive the identifying information for the wireless device from the second A/V device 210 before or concurrently with transmitting the video data (e.g., using a second sequence). Also, in this example for the process 1300 and/or the process 1400, the one or more predetermined conditions may include the processor 502 of the server 224 receiving, via the communication module 504, the pre-identified wireless device identifying data for the wireless device 118 from the first A/V device 210.

In some examples, the process 1300 and/or the process 1400 may include causing the processor 502 to receive, via the communication module 504, the video data using a greater bandwidth in the presence of the one or more predetermined conditions, as compared to using a lesser bandwidth in the absence of the one or more predetermined conditions. For example, the process 1300 and/or the process 1400 may include causing the processor 502 of the server 224 to receive, via the communication module 504, the video data from at least the second A/V device 210 using the greater bandwidth in the presence of the one or more predetermined conditions being met for the processor 502, as compared to the processor 502 receiving the video data using the lesser bandwidth. In the process 1300 and/or the process 1400, for example, in response to receiving, by the processor 502 and via the communication module 504, the identifying information for the wireless device 118 including the pre-identified wireless device identifying data from the first A/V device 210, the processor 502 may cause the communication module 504 to receive the video data using the greater bandwidth. In this example for the process 1300 and/or the process 1400, in the absence of receiving the identifying information for the wireless device 118 including the pre-identified wireless device identifying data from the first A/V device 210, the processor 502 may not cause the communication module 504 to receive the video data from the second A/V device 210 using the lesser bandwidth. Also, in this example for the process 1300 and/or the process 1400, the one or more predetermined conditions may include the processor 502 of the server 224 receiving, via the communication module 504, the pre-identified wireless device identifying data for the wireless device 118 from the first A/V device 210.

Figure 15:
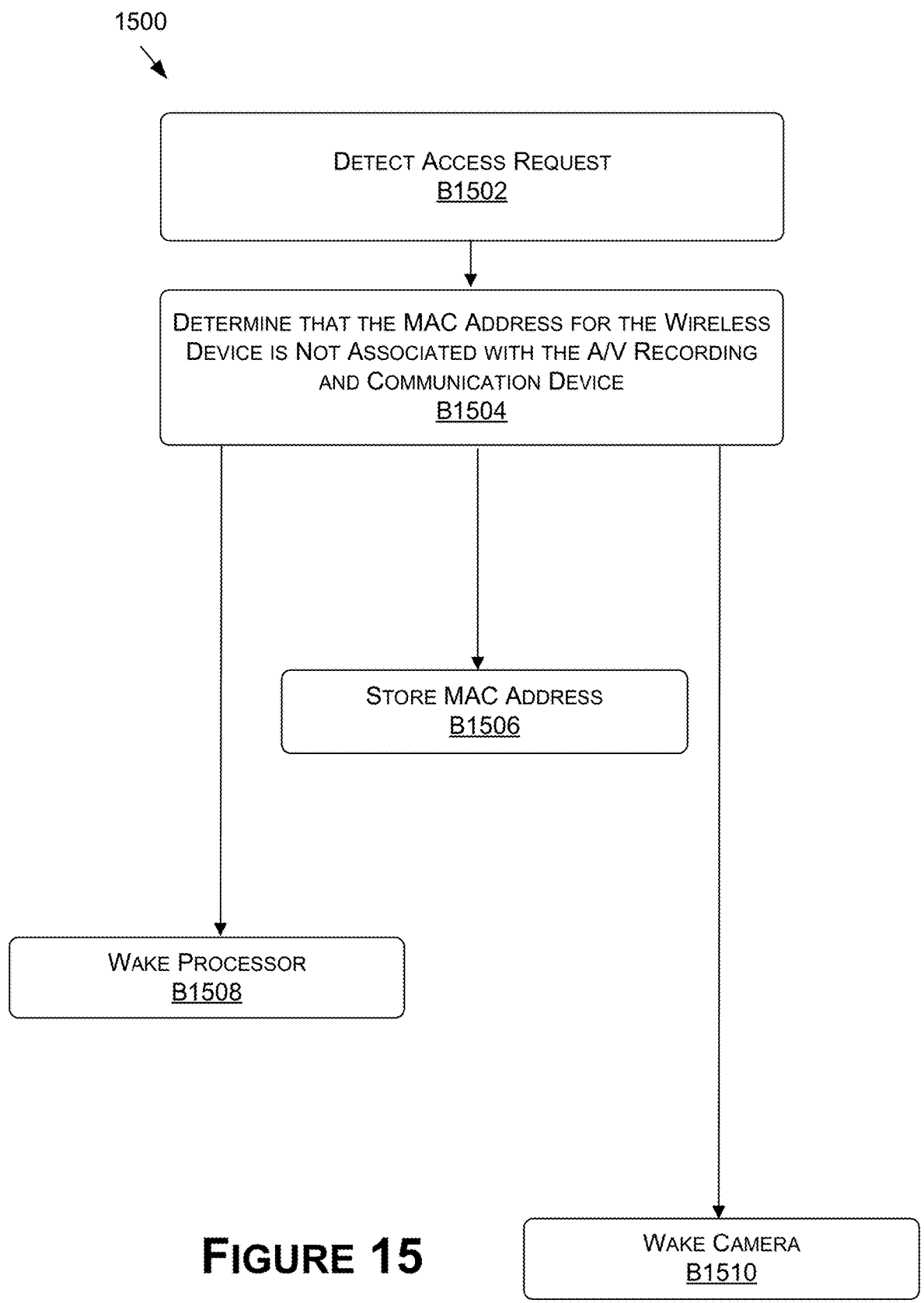
FIG. 15 is a flowchart illustrating another example aspect of the process shown in FIG. 13, according to various aspects of the present disclosure.

FIG. 15 is a flowchart illustrating an example aspect of the process 1300 shown in FIG. 13, according to various aspects of the present disclosure. One or more blocks shown in FIG. 15 may be performed by the network-connected device 110 in cases where the A/V device 210 and components associated with and/or in communication with the A/V device 210 are configured to detect an access request by the wireless device 118 to a wireless network associated with the A/V device 210 (e.g., at the A/V device 210 user's home). For those embodiments where the identifying information for the wireless device 118 includes the MAC address of the wireless device 118, the process 1500, at block B1502, detects an access request of the wireless device 118 to the WiFi network associated with the A/V recording and communication device (e.g., the A/V device 210). For example, the processor 502 of the server 224 may, via the communication module 504, detect the access request of the wireless device 118 to the WiFi network of the user's network 218. In various embodiments, the access request may instead be any other type of passive or active signal from a wireless device from which identifying information may be determined.

The process 1500, at block B1504, may determine that the MAC address or other identifying information for the wireless device 118 is not associated with the A/V device 210. For example, the processor 502 of the server 224 may determine that the MAC address for the wireless device 118 is not associated with a listing of known and/or allowed devices permitted to access the WiFi network of the user's network 218. In that case, the processor 502 of the server 224 may facilitate denying the WiFi access request by the wireless device 118. Alternatively, where, at block B1504, the process 1400 determines that the MAC address for the wireless device 118 is associated with the A/V device 210, the processor 502 of the server 224 may facilitate granting the WiFi access request by the wireless device 118.

The process 1500, at block B1506, stores the MAC address. For example, the processor 502 stores the MAC address of the wireless device 118 in the memory 506 of the server 224 in response to determining, at block B1504, that the MAC address for the wireless device 118 is not associated with the listing of known MAC addresses for the WiFi network. Alternatively, where, at block B1504, the process 1500 determines that the MAC address for the wireless device 118 is associated with the A/V device 210, block B1506 may not be performed in the process 1500.

The process 1500, at block B1508, wakes the computing device (e.g., processor 502) from a passive state to begin receiving the identifying information for the wireless device. For example, the processor 502 of the server 224 may, after it is awoken in the process 1500, wake the communication module 504 of the server 224. In some examples, block B1508 includes waking the processor 502 and/or the communication module 504 from the passive state in response to determining, at block B1504, that the MAC address for the wireless device 118 is not associated with the listing of known MAC addresses for the WiFi network. Alternatively, where, at block B1504, the process 1500 determines that the MAC address for the wireless device 118 is associated with the A/V device 210, block B1508 may not be performed in the process 1500.

The process 1500, at block B1510, wakes the camera 314 of the A/V device 210 from the passive state to begin recording the video data. For example, the processor 502 of the server 224 may wake the camera 314 of the A/V device 210 from the passive state in response to determining, at block B1504, that the MAC address for the wireless device 118 is not associated with the listing of known MAC addresses for the WiFi network. Alternatively, where, at block B1504, the process 1500 determines that the MAC address for the wireless device 118 is associated with the A/V device 210, block B1510 may not be performed in the process 1500.

In various embodiments, when it is determined, at block B1504, that the MAC address (or any other kind or type of identifier including identifying information determined from passive or active signals from the wireless device 118) for the wireless device 118 is not associated with the A/V device 210, the process 1500 may include transmitting a notification to the client device(s) 214, 216. The notification may comprise, for example, a push notification, and may indicate that an unrecognized and/or unauthorized wireless device was detected. For example, since an unrecognized wireless device may be associated with an intruder (e.g., a burglar), the notification to the client device(s) 214, 216 may include warning language, such as "Intruder Wi-Fi packet detected." The notification may be sent prior to, or together with, image data (e.g., video) of the possible intruder. The foregoing aspects may be performed in addition to, or as an alternative to, blocks B1506, B1508, and B1510 of the process 1500. In various embodiments, notifications to the client device(s) 214, 216 may be suppressed when the MAC address (or any other kind or type of identifier including identifying information determined from passive or active signals from the wireless device 118) for the wireless device 118 is associated with the A/V device 210. That is, a notification to the client device(s) 214, 216 may only be sent when it is determined, at block B1504, that the MAC address (or any other kind or type of identifier including identifying information determined from passive or active signals from the wireless device 118) for the wireless device 118 is not associated with the A/V device 210. In this manner, unwanted notifications may be reduced, as it may be more likely that a user of the client device(s) 214, 216 may not want to receive a notification when a known person (e.g., a cohabitant, resident, family member, friend, etc.) is detected by the A/V device 210.

Figure 16:
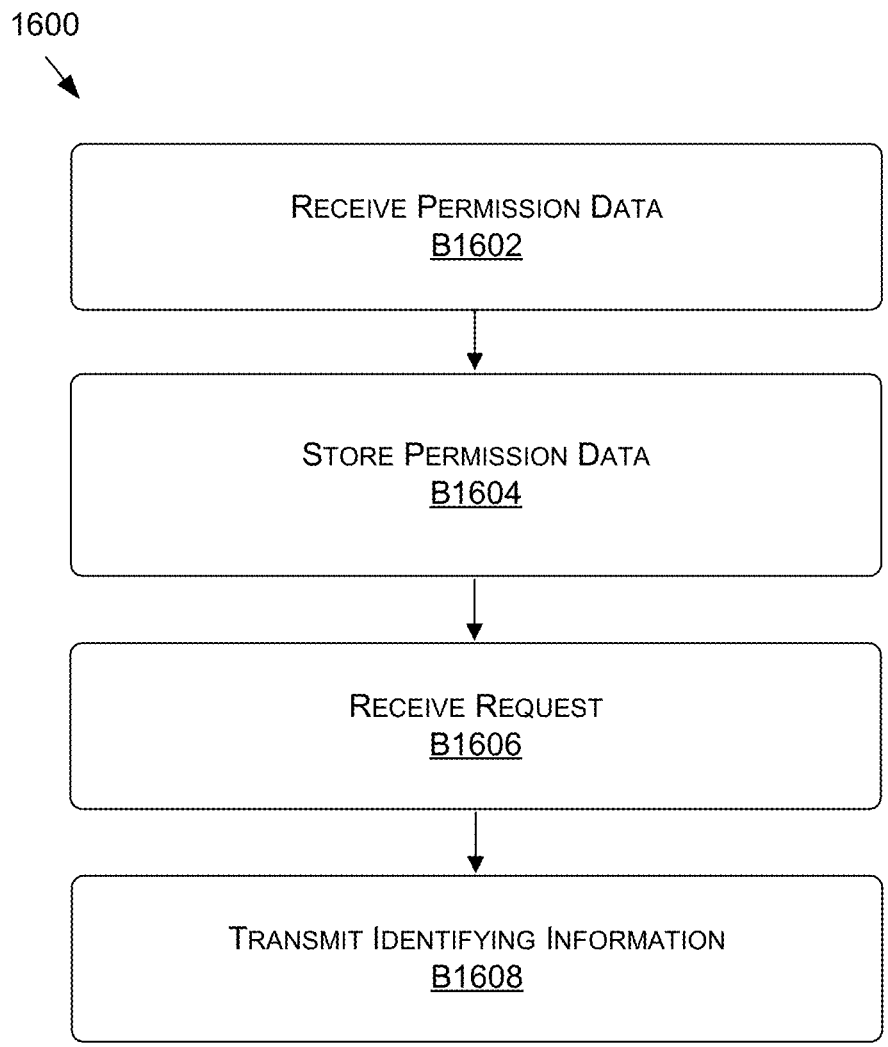
FIG. 16 is a flowchart illustrating another example aspect of the process shown in FIG. 13, according to various aspects of the present disclosure.

FIG. 16 is a flowchart illustrating an example aspect of the process 1300 shown in FIG. 13, according to various aspects of the present disclosure. One or more blocks shown in FIG. 16 may be performed by the network-connected device 110 in cases where user(s) associated with the A/V device 210 may provide permission for a third-party user and/or system to access and otherwise use the data stored by the network-connected device 110 (e.g., server 224). For example, the process 1600, at block B1602, receives permission data of the user of the A/V device 210. In some examples, the permission data is received, via the communication module 504, by the processor 502 of the server 224. The permission data received at block B1602 includes one of: a presence of, and an absence of, permission to store the identifying information for the wireless device 118 in the memory 506 of the server 224.

The process 1600, at block B1604, stores, via the processor 502, the permission data of the user of the A/V device 210 in the memory 506 of the server 224. The process 1600, at block B1606, may receive a request to transmit the identifying information for the wireless device 118 to an administrator system 130. For example, the processor 502 receives, via the communication module 504, the request to transmit the identifying information for the wireless device 118 to the administrator system 130. The process 1600, at block B1608, includes transmitting the identifying information for the wireless device 118 to the administrator system 130 in response to receiving, by the processor 502 via the communication module 504, the request from the administrator system 130. For example, in response to receiving the request from the administrator system 130, the processor 502 of the server 224 transmits, via the communication module 504, the identifying information for the wireless device 118 to the administrator system 130 in response to the permission data including the presence of permission to store the identifying information for the wireless device 118 in the memory 506 of the server 224.

Figure 17:
FIG. 17 is a flowchart illustrating an example process for geographically locating an object associated with activity of interest based on data collected from an A/V recording and communication device, according to various aspects of the present disclosure.

FIG. 17 is a flowchart illustrating an example process 1700 for geographically locating an object 106 associated with activity of interest based on data collected from an A/V recording and communication device, according to various aspects of the present disclosure. The process 1700, at block B1702, receives first video data of the object 106 in a first FOV 104 of a camera 314 of a first A/V recording and communication device (e.g., a first A/V device 210). In some examples, the object 106 may have the wireless device 118 associated with it, and the wireless device 118 may be proximate the object 106. For example, the person 114 may be carrying the wireless device 118 during such time when he or she is in the first FOV of camera 314 of the first A/V device 210 and/or the first FOV of the motion sensor(s) 326 of the first A/V device 210. For example, a computing device (e.g., processor 502 of the server 224) may receive, from the communication module 312 of the first A/V device 210, first video data of person 114 within the first FOV of the camera 314 of the first A/V device 210. In the process 1700, at block B1702, receiving the first video data of the object 106 may include receiving the first video data at the processor 502 of the server 224 via the communication module 504 of the server 224.

In the process 1700, block B1702 includes receiving first identifying information for the wireless device 118. For example, the processor 502 of the server 224 may receive, from the communication module 312 of first A/V device 210, the first identifying information for the wireless device 118. In the process 1700, at block B1702, receiving the first identifying information for the wireless device 118 may include receiving the first identifying information for the wireless device 118 at the processor 502 of the server 224 via the communication module 504 of the server 224.

The process 1700, at block B1704, receives an indication that at least one of the first video data, the object 106, and the wireless device 118 is associated with activity of interest. In some examples, the processor 502 of the server 224 may receive the indication that at least one of the first video data, the object 106, and the wireless device 118 is associated with activity of interest from the administrator system 130. In other examples, the processor 502 of the server 224 may receive the indication that at least one of the first video data, the object 106, and the wireless device 118 is associated with activity of interest from the client device(s) 214, 216.

The process 1700, at block B1706, receives second video data of the object 106 in a second FOV 104 of a camera 314 of a second A/V recording and communication device (e.g., a second A/V device 210). In some examples, while it is in the second FOV, the object 106 may have the wireless device 118 associated with it, and the wireless device 118 may be proximate the object 106. For example, the person 114 may be carrying the wireless device 118 during such time when he or she is in the second FOV of camera 314 of the second A/V device 210 and/or the second FOV of the motion sensor(s) 326 of the second A/V device 210. For example, the processor 502 of the server 224 may receive, from the communication module 312 of the second A/V device 210, second video data of person 114 within the second FOV of the camera 314 of the second A/V device 210. In the process 1700, at block B1706, receiving the second video data of the object 106 may include receiving the second video data at the processor 502 of the server 224 via the communication module 504 of the server 224.

In the process 1700, block B1706 includes receiving second identifying information for the wireless device 118. For example, the processor 502 of the server 224 may receive, from the communication module 312 of second A/V device 210, the second identifying information for the wireless device 118. In the process 1700, at block B1706, receiving the second identifying information for the wireless device 118 may include receiving the second identifying information for the wireless device 118 at the processor 502 of the server 224 via the communication module 504 of the server 224.

The process 1700, at block B1708, determines that the first and second identifying information identify the same wireless device 118. For example, the processor 502 of the server 224 may, upon receipt from the first and second A/V devices 210, store the first and second identifying information for the wireless device 118 in the memory 506 of the server 224. In some examples, block B1708 of the process 1700 may include comparing data for the first identifying information for the wireless device 118 to data for the second identifying information for the wireless device 118. In these embodiments, block B1708 of the process 1700 may include matching the data for the first identifying information for the wireless device 118 to the data for the second identifying information for the wireless device 118. The process 1700, at block B1710, associates the second video data with activity of interest. For example, the processor 502 of the server 224 may associate the second video with the activity of interest in response to determining, at block B1708, that the first and second identifying information identify the same wireless device 118. In various embodiments, a database such as the activity of interest database 522 may be updated (even if the database is a third-party database) with the association of the wireless device 118 as being of interest. In this way, other devices may use the database in the future to determine that a wireless device (and/or a person/vehicle associated with a wireless device) is of interest without having been in communication with the wireless device 118 before.

In some examples, the process 1700 may include determining, by the processor 502, a direction of movement of the object 106 based, at least in part, on the first video data and the second video data. In other examples, the process 1700 may include determining, by the processor 502, a speed of movement of the object 106 based, at least in part, on the first video data and the second video data. In these embodiments, determining the direction of movement and/or the speed of movement of the object 106 may facilitate geographically locating the object 106.

In some examples, in the process 1700, the object 106 includes a person 114. In other examples, where the object 106 is a person 114, the person 114 may be a criminal suspect or a crime victim. In other examples, the object 106 includes a pet. In some examples, the object 106 includes a vehicle 116. In other examples, where the object 106 includes a vehicle 116, the vehicle 116 may include the criminal suspect and/or the crime victim as a driver and/or passenger of the vehicle 116.

In other examples, the process 1700 includes identifying, by the processor 502 of the server 224, the object 106 in the first and second video data. In some examples, the process 1700 may include determining, by the processor 502 of the server 224, that a first appearance time of the object 106 in the first video data is within a first predetermined amount of time of a first receipt time of the first identifying information for the wireless device 118. In these examples, the process 1700 may include determining, by the processor 502, that a second appearance time of the object 106 in the second video data is within a second predetermined amount of time of a second receipt time of the second identifying information for the wireless device 118.

In those embodiments where the object 106 includes a vehicle 116, the process 1700 may include matching, by the processor 502, at least a portion of a license plate of the vehicle 116 in the first video data with at least a portion of the license plate of the vehicle 116 in the second video data. In some examples, the processor 502 uses alphanumeric character recognition for matching the at least a portion of the license plate of the vehicle 116 in the first video data with the at least a portion of the license plate of the vehicle 116 in the second video data. In those embodiments where the object 106 includes a person 114, the process 1700 includes matching, by the processor 502, at least a portion of a face of the person 114 in the first video data with at least a portion of the face of the person 114 in the second video data. In some examples, in the process 1700, the processor 502 uses facial feature recognition for matching the at least a portion of the face of the person 114 in the first video data with the at least a portion of the face of the person 114 in the second video data.

The above-described systems and methods use video data of the person 114 in the FOV of the camera 314 of the A/V device 210 along with the identifying information for the wireless device 118 being carried by the person 114 to provide a dual-level identification of the person 114 and to enable locating the person 114 in a geographic area. The features of the systems and methods disclosed herein provide for faster and more effective identification and apprehension of, for instance, criminal suspects for the benefit of public safety.

Figure 18:
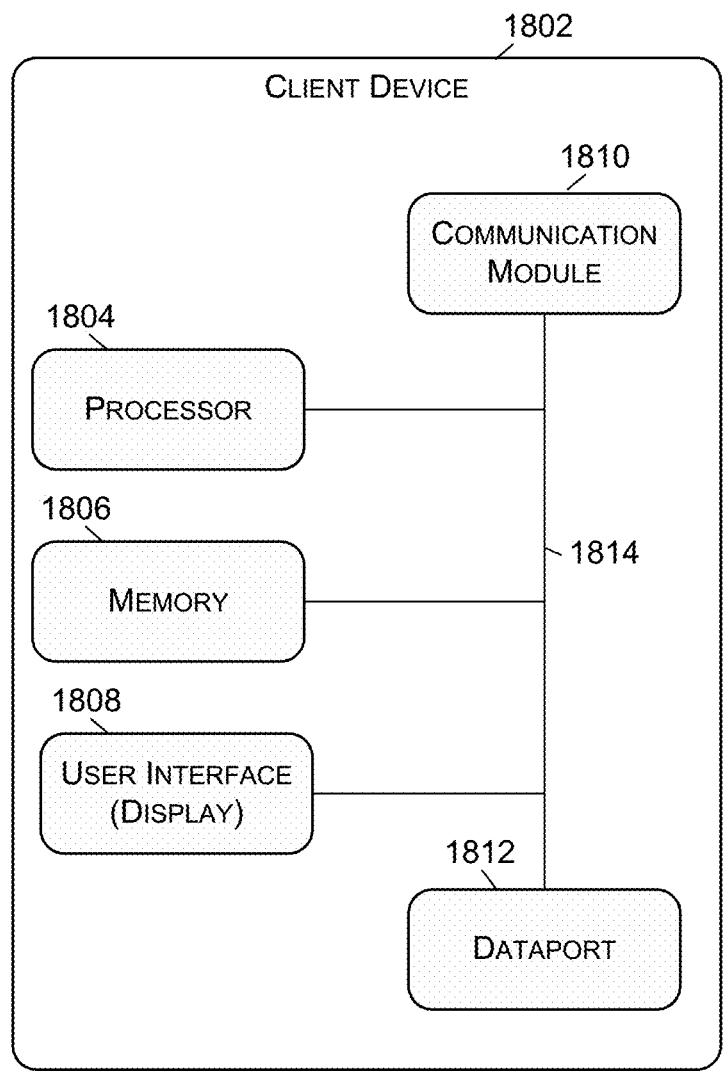
FIG. 18 is a functional block diagram of a client device on which the present embodiments may be implemented according to various aspects of the present disclosure.

FIG. 18 is a functional block diagram of a client device 1802 on which the present embodiments may be implemented according to various aspects of the present disclosure. The client device(s) 214, 216 described with reference to FIG. 2 may include some or all of the components and/or functionality of the client device 1802. The client device 1802 may comprise, for example, a smartphone.

With reference to FIG. 18, the client device 1802 includes a processor 1804, a memory 1806, a user interface 1808, a communication module 1810, and a dataport 1812. These components are communicatively coupled together by an interconnect bus 1814. The processor 1804 may include any processor used in smartphones and/or portable computing devices, such as an ARM processor (a processor based on the RISC (reduced instruction set computer) architecture developed by Advanced RISC Machines (ARM).). In some embodiments, the processor 1804 may include one or more other processors, such as one or more conventional microprocessors, and/or one or more supplementary co-processors, such as math co-processors.

The memory 1806 may include both operating memory, such as random-access memory (RAM), as well as data storage, such as read-only memory (ROM), hard drives, flash memory, or any other suitable memory/storage element. The memory 1806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1804 and the memory 1806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1804 may be connected to the memory 1806 via the dataport 1812.

The user interface 1808 may include any user interface or presentation elements suitable for a smartphone and/or a portable computing device, such as a keypad, a display screen, a touchscreen, a microphone, and a speaker. The communication module 1810 is configured to handle communication links between the client device 1802 and other, external devices or receivers, and to route incoming/outgoing data appropriately. For example, inbound data from the dataport 1812 may be routed through the communication module 1810 before being directed to the processor 1804, and outbound data from the processor 1804 may be routed through the communication module 1810 before being directed to the dataport 1812. The communication module 1810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1812 may be any type of connector used for physically interfacing with a smartphone and/or a portable computing device, such as a mini-USB port or an IPHONE®/IPOD® 30-pin connector or LIGHTNING® connector. In other embodiments, the dataport 1812 may include multiple communication channels for simultaneous communication with, for example, other processors, servers, and/or client terminals.

The memory 1806 may store instructions for communicating with other systems, such as a computer. The memory 1806 may store, for example, a program (e.g., computer program code) adapted to direct the processor 1804 in accordance with the present embodiments. The instructions also may include program elements, such as an operating system. While execution of sequences of instructions in the program causes the processor 1804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
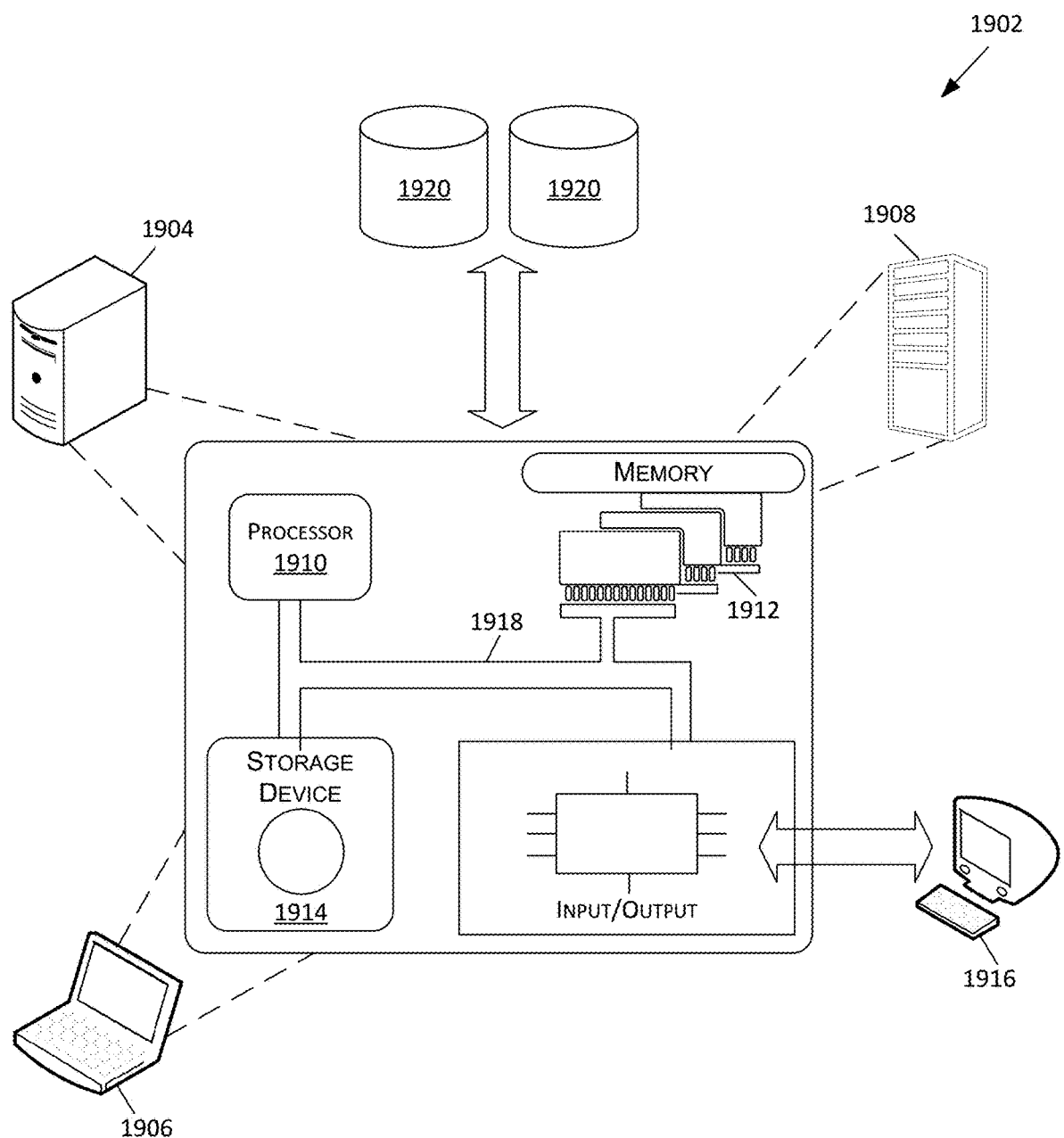
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of the present disclosure. The computer system 1902 may be embodied in at least one of a personal computer (also referred to as a desktop computer) 1904, a portable computer (also referred to as a laptop or notebook computer) 1906, and/or a server 1908 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1902 may execute at least some of the operations described above. The computer system 1902 may include at least one processor 1910, memory 1912, at least one storage device 1914, and input/output (I/O) devices 1916. Some or all of the components 1910, 1912, 1914, 1916 may be interconnected via a system bus 1918. The processor 1910 may be single- or multi-threaded and may have one or more cores. The processor 1910 execute instructions, such as those stored in the memory 1912 and/or in the storage device 1914. Information may be received and output using one or more I/O devices 1916.

The memory 1912 may store information, and may be a computer-readable medium, such as volatile or non-volatile memory. The storage device(s) 1914 may provide storage for the system 1902 and, in some embodiments, may be a computer-readable medium. In various aspects, the storage device(s) 1914 may be a flash memory device, a hard disk device, an optical disk device, a tape device, or any other type of storage device.

The I/O devices 1916 may provide input/output operations for the system 1902. The I/O devices 1916 may include a keyboard, a pointing device, and/or a microphone. The I/O devices 1916 may further include a display unit for displaying graphical user interfaces, a speaker, and/or a printer. External data may be stored in one or more accessible external databases 1920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method, comprising:
   receiving, by a computing device, video data from an A/V recording and communication device (A/V device) having a camera, the video data representing an object in a field of view (FOV) of the camera;
   receiving, by the computing device from the A/V device, identifying information for a wireless device proximate the object in the FOV of the camera;

after receiving the identifying information for the wireless device, storing, by the computing device, the video data and the identifying information for the wireless device in a memory;

receiving, by the computing device from a database, identifying information for one or more wireless devices associated with activity of interest;

determining, by the computing device, that the identifying information for the wireless device proximate the object in the FOV of the camera matches identifying information for a first wireless device from among the one or more wireless devices associated with activity of interest; and after determining that the identifying information for the wireless device associated with the object in the FOV of the camera matches the identifying information for the first wireless device, creating a record associating the video data with activity of interest.

2. The method of claim 1, further comprising sending, by the computing device, the record associating the video data with the activity of interest to at least one of an activity of interest database or a law enforcement computing device.

3. The method of claim 2, further comprising sending, by the computing device to at least one of the activity of interest database or the law enforcement computing device, the video data along with the record associating the video data with the activity of interest.

4. The method of claim 1, wherein the wireless device is not within the FOV of the camera.

5. The method of claim 1, wherein receiving the identifying information for the wireless device occurred at a first time, and wherein the method further comprises:

after receiving the identifying information for the wireless device at the first time, receiving, by the computing device from the A/V device, the identifying information for the wireless device at a second time; and after receiving the identifying information for the wireless device at the second time, sending, by the computing device to a client electronic device, a notification that the wireless device is present near the A/V device.

6. The method of claim 1, further comprising:

determining, by the computing device, that a location of the A/V device is within a threshold distance of a location associated with an occurrence of an event of interest; and generating, by the computing device, a notification indicating that the wireless device has been identified at the location of the A/V device.

7. The method of claim 1, further comprising, after determining that the identifying information for the wireless device proximate the object in the FOV of the camera matches the identifying information for the first wireless device, causing a security system associated with the A/V device to arm.

8. The method of claim 1, wherein the A/V device is a first A/V device and the camera of the first A/V device is a first camera, and wherein the method further comprises:

after determining that the identifying information for the wireless device proximate the object in the FOV of the first camera matches the identifying information for the first wireless device, causing at least a second A/V device to record video using a second camera of the second A/V device and/or causing the second A/V device to monitor for signals including the identifying information for the wireless device proximate the object in the FOV of the first camera.

9. The method of claim 1, wherein the identifying information for the wireless device is received as part of a passive signal transmitted from the wireless device.

10. The method of claim 9, wherein the passive signal comprises a signal searching for an available wireless access point or available wireless network.

11. The method of claim 9, wherein the passive signal comprises at least one of a location services signal, a near field communication (NFC) signal, a Bluetooth signal, or an electro-magnetic field (EMF) signal.

12. The method of claim 9, wherein the passive signal is sent while the wireless device is on, while the wireless device is off while a screen of the wireless device is on, while the screen of the wireless device is off, while the screen of the wireless device is displaying a lock screen, while the screen of the wireless device is displaying a home screen, while an app running on the wireless device is in active use, while the app is running in the background, while the wireless device is operating in an airplane mode, while a Wi-Fi functionality of the wireless device is enabled, while the Wi-Fi functionality of the wireless device is disabled, while a Bluetooth functionality of the wireless device is enabled, or while the Bluetooth functionality of the wireless device is disabled.

13. A method, comprising:

receiving, by a computing device from a first A/V recording and communication device (A/V device) having a first camera, first video data representing a first object in a first field of view (FOV) of the first camera;

receiving, by the computing device from the first A/V device, first identifying information for a first wireless device proximate the first object in the first FOV of the first camera;

receiving an indication that at least one of the first video data, the first object, or the first wireless device is associated with activity of interest;

receiving, by the computing device from a second A/V device having a second camera, second video data representing a second object in a second FOV of the second camera;

receiving, by the computing device from the second A/V device, second identifying information for the first wireless device proximate the second object in the second FOV of the second camera;

determining, by the computing device, that the first identifying information and the second identifying information both identify the first wireless device; and associating, by the computing device, the second video data with the activity of interest.

14. The method of claim 13, wherein the first object and the second object are the same object.

15. The method of claim 13, further comprising:

determining; by the computing device based at least in part on the first video data, the second video data, and location information of the first A/V device and the second A/V device; at least one of an estimated direction of movement or an estimated speed of movement of the object; and sending, by the computing device to a law enforcement electronic device or a client electronic device, a notification indicating the at least one of the estimated direction of movement or the estimated speed of movement.

16. The method of claim 13, wherein:

at least one of the first identifying information or the second identifying information for the wireless device is received as part of a passive signal transmitted from the wireless device; and the passive signal comprises at least one of a signal searching for an available wireless access point or available wireless network, a location services signal, a near field communication (NFC) signal, a Bluetooth signal, or an electro-magnetic field (EMF) signal.

17. A method, comprising:

receiving, by a computing device from a law enforcement computing device, identifying information relating to a wireless device;

sending, by the computing device to one or more A/V recording and communication devices (A/V devices) including a first NV device, an instruction to monitor for the wireless device comprising the identifying information;

receiving, by the computing device from the first A/V device, a first notification that the wireless device has been identified based on the identifying information;

receiving, by the computing device from the first A/V device, video recorded by the first A/V device; and sending, by the computing device to the law enforcement computing device, a second notification that the wireless device has been identified and the video.

18. The method of claim 17, wherein the identifying information for the wireless device is received at the first A/V device as part of a passive signal transmitted from the wireless device.

19. The method of claim 18, wherein:

at least one of the first identifying information or the second identifying information for the wireless device is received as part of a passive signal transmitted from the wireless device; and the passive signal comprises at least one of a signal searching for an available wireless access point or available wireless network, a location services signal, a near field communication (NFC) signal, a Bluetooth signal, or an electro-magnetic field (EMF) signal.

20. The method of claim 18, wherein the second notification further comprises location information related to the first A/V device.

* * * * *